United States Patent
Kim et al.

(10) Patent No.: US 7,609,353 B2
(45) Date of Patent: Oct. 27, 2009

(54) LIQUID CRYSTAL DISPLAY AND THIN FILM TRANSISTOR SUBSTRATE THEREFOR

(75) Inventors: Hee-Seop Kim, Gyeonggi-do (KR); Jae-Jin Lyu, Gyeonggi-do (KR); Doo-Hwan You, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/350,496

(22) Filed: Jan. 8, 2009

(65) Prior Publication Data

US 2009/0128750 A1    May 21, 2009

Related U.S. Application Data

(63) Continuation of application No. 10/916,519, filed on Aug. 12, 2004, now Pat. No. 7,545,472.

(30) Foreign Application Priority Data

Aug. 13, 2003   (KR)   .................. 10-2003-0056069

(51) Int. Cl.
*G02F 1/1343* (2006.01)
(52) U.S. Cl. .................. 349/144; 349/146; 349/139; 349/129; 349/38
(58) Field of Classification Search ......... 349/144–146, 349/129, 139, 96, 38, 43
See application file for complete search history.

(56) References Cited

U.S. PATENT DOCUMENTS

| | | | |
|---|---|---|---|
| 5,610,739 A | 3/1997 | Uno et al. | |
| 6,022,646 A | 2/2000 | Kim et al. | |
| 6,043,511 A | 3/2000 | Kim | |
| 6,724,452 B1 | 4/2004 | Takeda et al. | |
| 6,850,302 B2 | 2/2005 | Song | |
| 6,958,791 B2 | 10/2005 | Shimoshikiryo | |
| 2003/0001998 A1* | 1/2003 | Kun | ........................... 349/129 |

FOREIGN PATENT DOCUMENTS

| | | |
|---|---|---|
| CN | 1211745 | 3/1999 |
| EP | 0884626 | 12/1998 |

* cited by examiner

*Primary Examiner*—Thoi V Duong
(74) *Attorney, Agent, or Firm*—Cantor Colburn LLP

(57) ABSTRACT

The invention is directed to an improved flat panel liquid crystal display (LCD). In one embodiment the improved LCD includes a liquid crystal layer that completely fills a gap formed between a color filter array and a thin film transistor (TFT) array. The TFT array includes a substrate that includes one or more pixel areas. Each pixel area may be divided into at least two pixel sub-areas. Each pixel sub-area is configured to have a different electric field than its counterparts, such that mutual compensation in the sub-areas decreases distortion of a gamma curve and improves lateral visibility of the flat panel display. In one embodiment, a first pixel electrode is formed in a first of the at least two pixel sub-areas; and a second pixel electrode is formed in a second of the at least two pixel sub-areas.

12 Claims, 24 Drawing Sheets

LIQUID CRYSTAL DISPLAY AND THIN FILM TRANSISTOR SUBSTRATE THEREFOR

CROSS-REFERENCE TO RELATED APPLICATION

This application is a continuation application of U.S. application Ser. No. 10/916,519, filed on Aug. 12, 2004, which claims priority of Korean Patent Application No. 10-2003-0056069, filed on Aug. 13, 2003, and all the benefits accruing therefrom under 35 U.S.C. § 119, the contents of which in its entirety are herein incorporated by reference.

BACKGROUND OF THE INVENTION

The present invention relates to liquid crystal displays generally, and more particularly an improved thin film transistor array panel.

A liquid crystal display (LCD) is one of the most widely used flat panel displays. An LCD includes two panels provided with field-generating electrodes and a liquid crystal (LC) layer interposed therebetween. The LCD displays images by applying voltages to the field-generating electrodes to generate an electric field in the LC layer, which determines orientations of LC molecules in the LC layer which adjusts the polarization of incident light.

A conventional LCD provides a narrow viewing angle. Various techniques for increasing the viewing angle have been suggested. In particular, one technique uses a vertically aligned LC and provides cutouts or protrusions at each field-generating electrodes. The cutouts and the protrusions reduce the aperture ratio. Therefore, there is a need to maximize the pixel electrode size. However, the closeness of the pixel electrodes causes strong lateral electric fields to form between them. The lateral electric fields dishevel orientations of the LC molecules and produce spots and light leakage. In turn, the spots and light leakage deteriorate overall display performance.

A LCD using cutouts or protrusions offers an excellent viewing angle, over 80 degrees in any direction. However, such a LCD has poor visibility, inferior even to a twisted nematic mode LCD. In a LCD using cutouts, discordance of the gamma curve between the front view and side view causes poor visibility.

For example, in a vertically aligned LCD using cutouts, the picture plane becomes brighter and the color shifts toward white as the viewing angle increases. When this phenomenon is excessive, the picture image is distorted because the brightness difference between gray scales disappears. A solution is needed that provides LCDs with improved visibility.

SUMMARY OF THE INVENTION

The invention is directed to an improved flat panel liquid crystal display (LCD). In one embodiment the improved LCD includes a liquid crystal layer that completely fills a gap formed between a color filter array and a thin film transistor (TFT) array. The TFT array includes a substrate that includes one or more pixel areas. Each pixel area may be divided into at least two pixel sub-areas. Each pixel sub-area is configured to have a different electric field than its counterparts, such that mutual compensation in the sub-areas decreases distortion of a gamma curve and improves lateral visibility of the flat panel display. In one embodiment, a first pixel electrode is formed in a first of the at least two pixel sub-areas; and a second pixel electrode is formed in a second of the at least two pixel sub-areas.

Additionally, the TFT array may further include one or more gate lines formed on the substrate and extending in a substantially transverse direction. One or more storage electrode lines may be spaced apart from the gate lines and formed on the substrate to extend in the same substantially transverse direction as the gate lines. In one embodiment, each of the one or more gate lines and the one or more storage electrode lines have a multi-layer structure that includes two films that have different physical characteristics.

A gate insulation layer may be formed over the gate lines and the storage electrode lines, and a plurality of ohmic contacts formed on the gate insulation layer. Additionally, a plurality of drain electrodes, a plurality of data lines, and a plurality of coupling electrodes may be formed on the plurality of ohmic contacts and the gate insulation layer. In one embodiment, each data line is bent and includes a plurality of pairs of oblique portions and a plurality of longitudinal portions. The first ends of each pair of the plurality of pairs of oblique portions are connected to form a chevron, and the second ends of each pair of the plurality of pairs of oblique portions are connected to at least one of the plurality of longitudinal portions. A pair of oblique portions of each of the plurality of data lines may be about one to nine times longer than longitudinal portions.

In another embodiment, the TFT array includes a substrate that includes one or more pixel areas. Each pixel area is separated into at least two pixel sub-areas, and each of the at least two pixel sub-areas is configured to decrease distortion of a gamma curve and improve lateral visibility of the LCD display. A first pixel electrode may be formed in a first of the at least two pixel sub-areas; and a second pixel electrode may be formed in a second of the at least two pixel sub-areas. Each of the one or more pixel areas may be divided into the at least two pixel sub-areas by one or more cutouts, or by one or more protrusions, formed between the first pixel electrode and the second pixel electrode.

DETAILED DESCRIPTION OF THE PREFERRED EMBODIMENTS OF THE INVENTION

Figure 1:
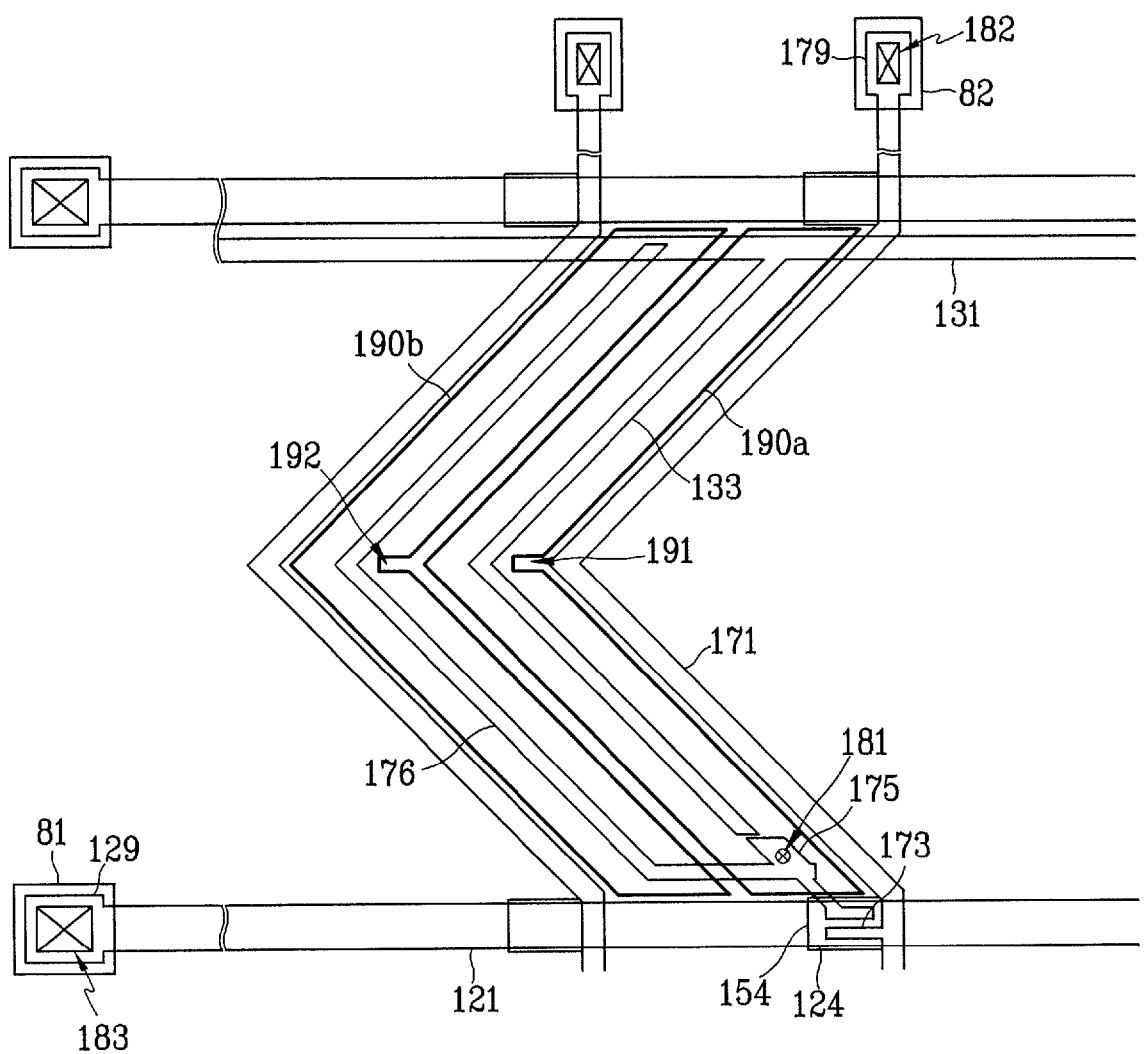
FIG. 1 is a top view of a thin film transistor array panel for a LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Liquid crystal displays and thin film transistor (TFT) array panels for a LCD according to embodiments of the present invention are described below with reference to the accompanying drawings.

Figure 2:
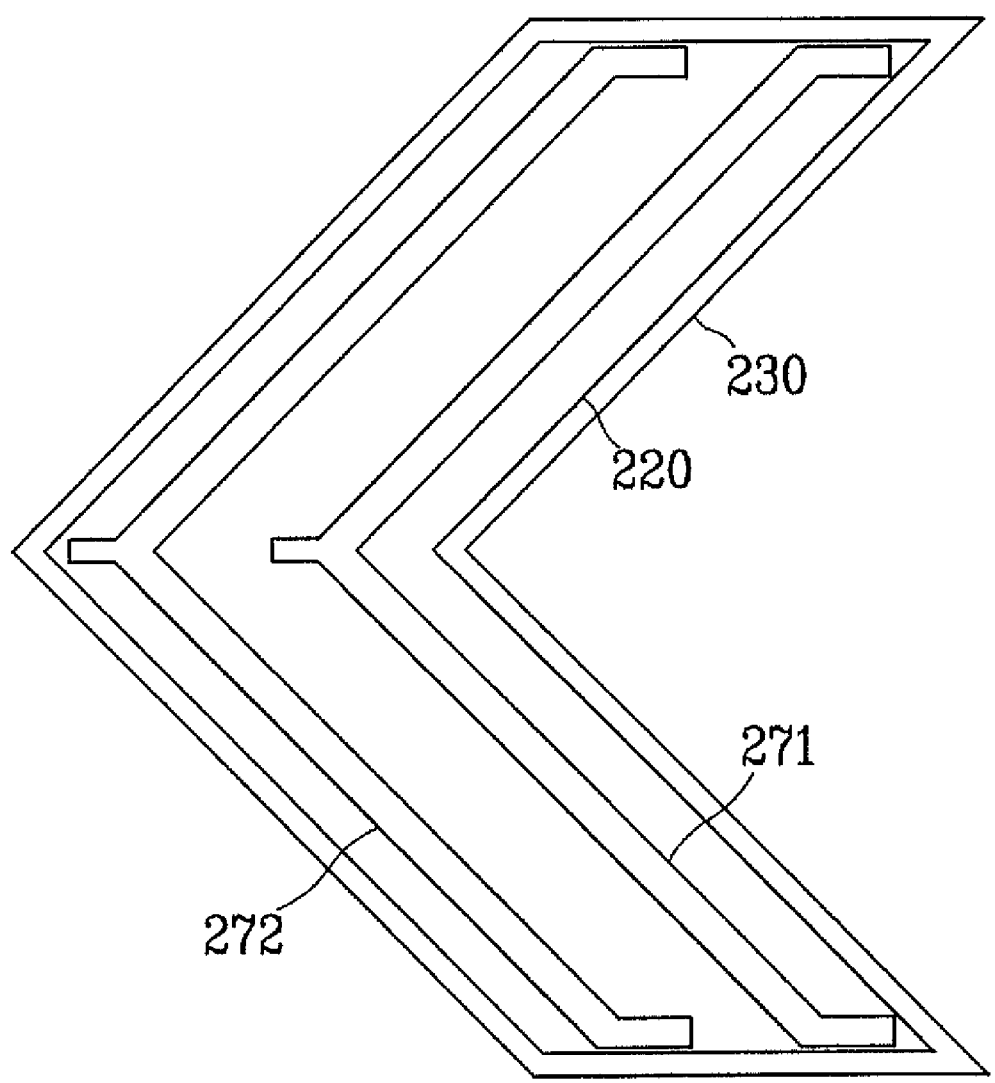
FIG. 2 is a top view of a common electrode panel for a LCD according to an embodiment of the present invention.
Figure 3:
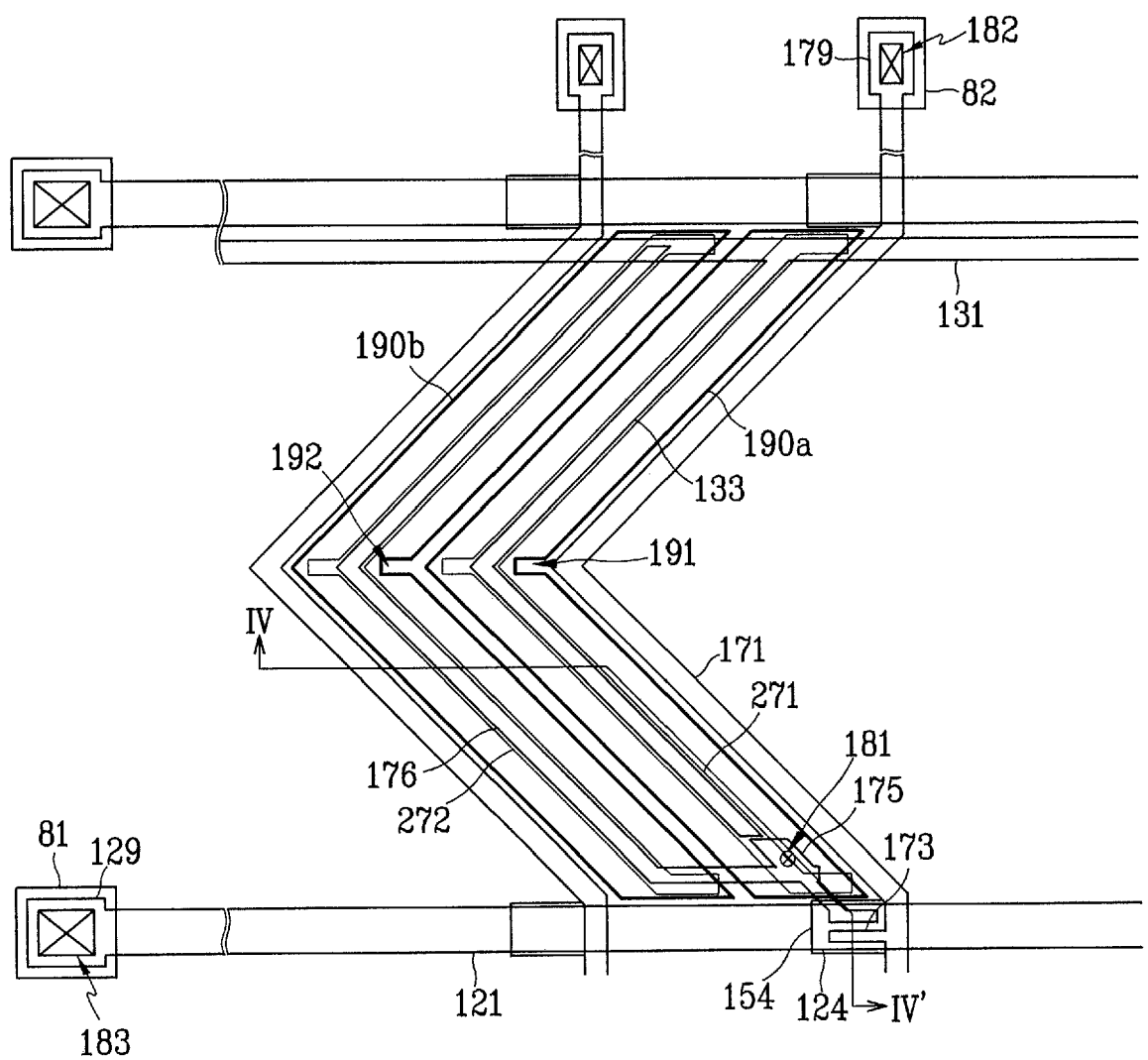
FIG. 3 is a top view of an LCD according to the embodiment shown in FIGS. 1 and 2.
Figure 4:
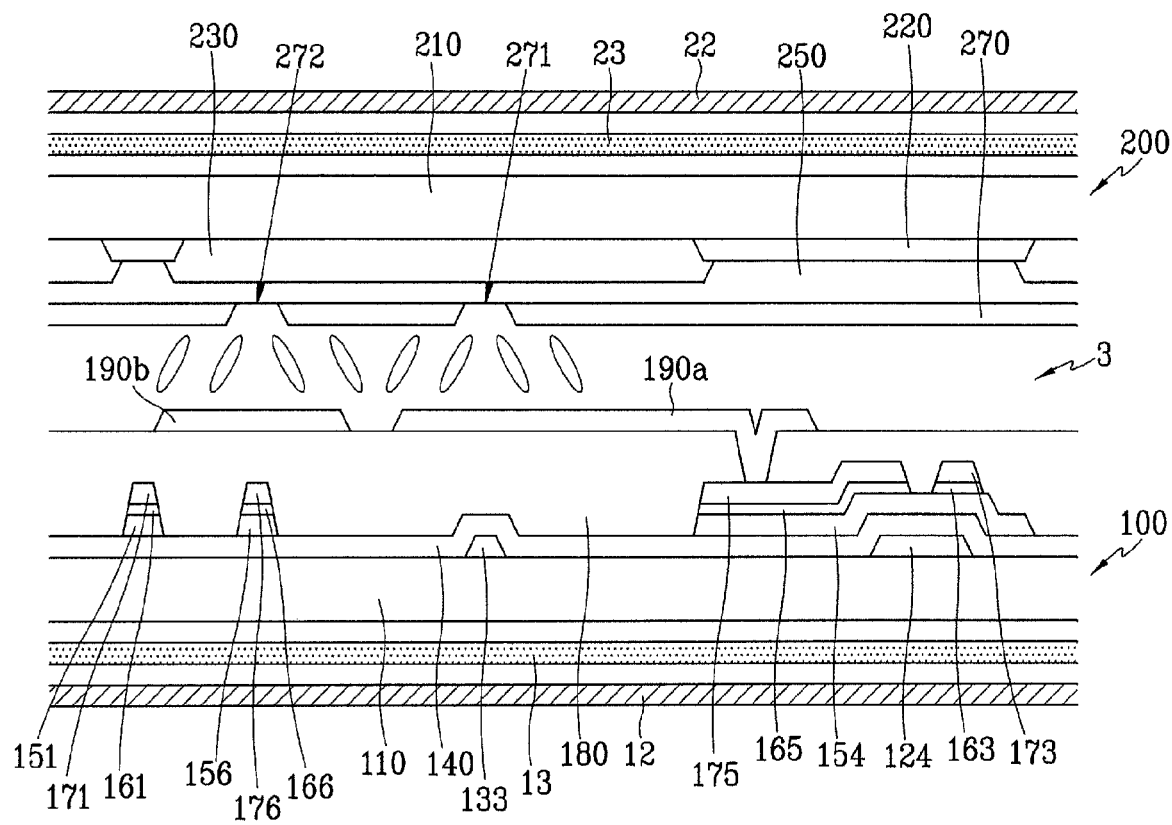
FIG. 4 is a sectional view of the LCD shown in FIG. 3 taken along the line IV-IV'.

FIG. 1 is a top view of a thin film transistor array panel for a LCD according to an embodiment of the present invention, FIG. 2 is a top view of a common electrode panel for a LCD according to an embodiment of the present invention, FIG. 3 is a top view of an LCD according to the embodiment shown in FIGS. 1 and 2, and FIG. 4 is a sectional view of the LCD shown in FIG. 3 taken along the line IV-IV'.

An LCD according to an embodiment of the present invention includes a TFT array panel 100, a common electrode panel 200, and a LC layer 3 interposed between the panels 100 and 200, which contains a plurality of LC molecules that are substantially vertically aligned to surfaces of the panels 100 and 200.

Referring now to FIGS. 1 and 4, a plurality of gate lines 121 and a plurality of storage electrode lines 131 are formed on an insulating substrate 110.

As illustratively shown in FIG. 1, the gate lines 121 extend substantially in a transverse direction and are separated from each other. Each gate line 121 transmits gate signals, and may include, not only a plurality of gate electrodes 124, but also at least one gate pad 129 for connecting to an external circuit.

Like the gate lines 121, each storage electrode line 131 extends substantially in the transverse direction. In one embodiment, a storage electrode line 131 substantially parallels a gate line 121. Additionally, each storage electrode line includes a plurality of branches that form a corresponding plurality of storage electrodes 133. In one embodiment, each storage electrode 133 includes a pair of oblique portions that make an angle of about 45 degrees with the storage line 131. Two oblique portions forming a pair make an angle about 90 degrees with each other. In use, storage electrode lines 131 are supplied with a predetermined voltage, for example, a common voltage applied to a common electrode 270 formed on the other panel 200 of the LCD, as shown in FIG. 4.

Referring to FIG. 1, the lateral sides of the gate lines 121 and the storage electrode lines 131 may be tapered. If tapered, the inclination angle of the lateral sides with respect to a surface of the substrate 110 is in a range of about 30-80 degrees.

Each of the gate lines 121 and the storage electrode lines 131 may have a multi-layered structure that includes two films that have different physical characteristics from each other. Illustratively, each line may include a lower film (not shown) and an upper film (not shown). The upper film is preferably made of a low resistivity metal, such as, for example Al, a metal containing Al, or an Al alloy. A low resistivity metal is used to reduce signal delay or voltage drop in the gate lines 121 and the storage electrode lines 131. On the other hand, the lower film is preferably made of a material such as Cr, Mo, or a Mo alloy. However, any material that has good contact characteristics with other materials, for example, indium tin oxide (ITO), indium zinc oxide (IZO) or similar materials, may be used. A good exemplary combination of the lower film material and the upper film material is Cr and an Al—Nd alloy. In such a combination, Cr forms the lower film and the Al—Nd alloy forms the upper film.

Referring to FIG. 4, gate insulating layer 140 preferably made of silicon nitride (SiNx) may be formed on the gate lines 121 and the storage electrode lines 131.

A plurality of semiconductor strips 151 preferably made of hydrogenated amorphous silicon (abbreviated to "a-Si") is formed on the gate insulating layer 140. As illustratively shown, each semiconductor strip 151 extends substantially in the longitudinal direction and has a plurality of projections 154 branched out toward the gate electrodes 124. An extension 156 may be elongated from the projection 154.

Each of the semiconductor strips 151 is repeatedly bent and includes a plurality of pairs of oblique portions and a plurality of longitudinal portions. Two oblique portions making a pair are connected to each other to form a chevron and opposite ends of the pair of oblique portions are connected to respective longitudinal portions. In one embodiment, the oblique portions of the semiconductor strip make an angle about 45 degrees with the gate lines 121, and the longitudinal portions cross over the gate electrodes 124. Illustratively, a pair of oblique portions is about one to nine times longer than a longitudinal portion. That is, it occupies about 50-90 percent of the total length of the pair of oblique portions and the longitudinal portion.

The extension 156 includes a drain portion extended obliquely from the projection 154, a pair of oblique portions making an angle about 45 degrees with the gate lines 121, and a connector connecting the drain portion and an end of the pair of oblique portions.

A plurality of ohmic contact strips 161 and islands 165, preferably made of silicide or n+ hydrogenated a-Si heavily doped with n type impurity, may be formed on the semiconductor strips 151 and extensions 156 islands 154. Each ohmic contact strip has a plurality of projections 163. In one embodiment, the projections 163 and the ohmic contact islands 165 are located in pairs on the projections 154 of the semiconductor strips.

The edge surfaces of the semiconductor strips 151 and the ohmic contacts 161, 165, and 166 are tapered, and the inclination angles of the edge surfaces of the semiconductor strips 151 and the ohmic contacts 161, 165, and 166 are preferably in a range of about 30-80 degrees.

A plurality of data lines 171, a plurality of drain electrodes 175, and a plurality of coupling electrodes 176 are formed on the ohmic contacts 161, 165, and 166 and the gate insulating layer 140, respectively. Designed to transmit data voltages, the data lines 171 extend substantially in the longitudinal direction and intersect both the gate lines 121 and the storage electrode lines 131. Each data line 171 is bent repeatedly and include a plurality of pairs of oblique portions and a plurality of longitudinal portions. In one embodiment, each pair of oblique portions is connected to form a chevron. The opposite ends of each pair of oblique portions are connected to respective longitudinal portions. The oblique portions of the data lines 171 make an angle of about 45 degrees with the gate lines 121, and the longitudinal portions cross over the gate electrodes 124. The length of a pair of oblique portions is about one to nine times the length of a longitudinal portion. That is, it occupies about 50-90 percent of the total length of the pair of oblique portions and the longitudinal portion. When an LCD is configured in this manner, pixel areas defined by crossing of the gate line 121 and the data line 171 appear to have a bent strip shape.

As shown in FIG. 1, each data line 171 may include 179 a data pad that is wider than the data line for contacting another layer or an external device. A plurality of branches of each data line 171 may project toward drain electrodes 175 to form a plurality of source electrodes 173. As shown, pairs of source electrodes 173 and drain electrodes 175 are separated from and facing each other with a gate electrode 124 there between. In one embodiment, the combination of a gate electrode 124, a source electrode 173, and a drain electrode 175, together with a projection 154 of a semiconductor strip 151, forms a TFT having a channel formed in the projection 154 disposed between the source electrode 173 and the drain electrode 175.

The coupling electrode 176 extends at an end of the first portion from the drain electrode 175 and elongates in a horizontal direction at a first portion is bent to substantially parallel the pair of oblique portions of the data line 171. In one embodiment, a second portion of the coupling electrode 176 makes an angle of about 135 degrees with the gate line 121. Similarly, a third portion of the coupling electrode 176 makes an angle of about 45 degrees with the gate line 121.

Each of data lines 171, the drain electrodes 175, and the coupling electrodes 176 may have a multi-layered structure that includes two films having different physical characteristics. For example, each data line drain electrode, and coupling electrode may include a lower film (not shown) and an upper film (not shown). In one embodiment, the upper film is preferably made of low resistivity metal that includes, for example, Al or an Al alloy. A low resistivity material is used to reduce signal delay or voltage drop in the data lines. On the other hand, the lower film may be preferably made of a material that has good contact characteristics with indium tin oxide (ITO), indium zinc oxide (IZO) or similar materials. Illustrative lower film materials include but are not limited to Cr, Mo, or a Mo alloy. A good exemplary combination of a lower film material and an upper film material is Cr and Al—Nd alloy. In such a combination, Cr forms the lower material and an Al—Nd alloyforms the upper film.

Additionally, the lateral sides of each of the data lines 171, the drain electrodes 175, and the coupling electrodes 176 may be tapered. If tapered, the inclination angle of the lateral sides with respect to a surface of the substrate 110 is in the range of about 30-80 degrees.

A passivation layer 180 may be formed on the data lines 171, the drain electrodes 175, and the coupling electrodes 176. In one embodiment, the passivation layer 180 is preferably made of a flat photosensitive organic material and low dielectric insulating material having a dielectric constant under 4.0. Exemplary materials used to form passivation layer 180 include, but are not limited to a-Si:C:O and a-Si:O: F, each formed by plasma enhanced chemical vapor deposition (PECVD). Alternatively, an inorganic material such as silicon nitride and silicon oxide may be used.

In one embodiment, passivation layer 180 includes a plurality of contact holes 181 and 182 that expose the drain electrodes 175 and the data pads 179 of the data lines 171, respectively. Additionally, the passivation layer 180 and the gate insulating layer 140 have a plurality of contact holes 183, that expose gate pads 129 of the gate lines 121. Illustratively, the sidewalls of the contact holes 181, 182, and 183 may make an angle of about 30-85 degrees with respect to the surface of the substrate 110 and may also include one or more stepped portions. Depending on the embodiment, the contact holes 181, 182, and 183 may have various planar shapes, such as a rectangular or circular shape. In one embodiment, the area of each contact hole 181, 182, and 183 is preferably greater than or equal to about 0.5 mm×15 μm and not larger than about 2 mm×60 μm.

In one embodiment, a plurality of pairs of pixel electrodes 190a and 190b and a plurality of contact assistants 81 and 82, which are preferably made of ITO, IZO or Cr, are formed on the passivation layer 180.

Each pair of pixel electrodes 190a and 190b may have a shape of a bent band that follows the shape of the pixel area. The pixel electrodes 190a and 190b are distinguished into a first pixel electrode 190a and a second pixel electrode 190b respectively having cutouts 191 and 192. The first pixel electrode 190a and the second pixel electrode 190b have substantially the same shape, divide a pixel area into a right area and a left area, and respectively occupy the right area and the left area. Therefore, portions of the first pixel electrode 190a may correspond to parallel portions of the second pixel electrode 190b.

The first pixel electrode 190a is physically and electrically connected to the drain electrodes 175 through the contact hole 181. The second pixel electrode 190b is physically and electrically floated, but overlaps the coupling electrode 176 to form coupling capacitances with the first pixel electrode 190a. As a result, the voltage of the second pixel electrode 190b depends on the voltage of the first pixel electrode 190a. With respect to the common voltage, the voltage of the second pixel electrode 190b is always smaller than that of the first pixel electrode 190a. The coupling relationship between the first pixel electrode 190a and the second pixel electrode 190b will be described later in detail with reference to FIG. 5.

In one embodiment, it shows that when a pixel area includes two sub-areas with somewhat different electric fields, a mutual compensation in the two subareas improves the lateral visibility of the LCD.

A plurality of contact assistants 81 and 82 may be respectively connected to the gate pad 129 of the gate lines 121 and the gate pad 179 of the data lines 171 through the contact holes 182b and 183b formed on the passivation layer 180. The pixel electrodes 190a and 190b and the contact assistants 81 and 82 may be made of ITO (indium tin oxide), IZO (indium zinc oxide), or similar materials.

The common electrode panel 200 is now described with reference to FIGS. 2, 4, and 5.

Referring to FIG. 2, a black matrix 220 for preventing light leakage is formed on an insulating substrate 210 such as transparent glass. A plurality of red, green and blue color filters 230 are formed on the black matrix and the substrate 210 and extend substantially along the columns of the pixel areas and periodically bend as the shape of the pixel areas bends. In other words, the color filters 230 extend substantially in the longitudinal direction along pixel columns defined by black matrix 220 and are periodically bent along the shape of pixel area. As shown in FIG. 4, an overcoat 250 is formed on the color filters 230 and the black matrix 220. A common electrode 270, preferably made of transparent conductive material such as ITO and IZO, may be formed on the overcoat 250. In one embodiment, the common electrode 270 includes a plurality of cutouts 271 and 272. The cutouts 271 and 272 may function as domain control means and are preferably about 9~12 μm wide. When organic protrusions replace the cutouts 271, the organic protrusions are preferably about 5~10 μm wide.

As shown in FIG. 4, each pair of cutouts 271 and 272 are disposed in a pixel area and is bent along the shape of pixel area. The cutouts 271 and 272 are respectively disposed to divide the first pixel electrodes 190a and the second pixel electrode 190b into right half portions and left half portions. Both ends of the cutouts 271 and 272 are bent and extend to a predetermined length in a direction that substantially parallels the gate lines 121. Centers of the cutouts 271 and 272 also extend to a predetermined length and are substantially parallel the gate lines 121. In one embodiment, the extending direction of the centers of the cutouts 271 and 272 is opposite to that of the ends of the cutouts 271 and 272.

The LCD includes a TFT array panel 100, a color filter array panel 200 facing the TFT array panel 100 and separated by a predetermined gap, and a liquid crystal layer 3 filled in the predetermined gap.

The LC molecules in the LC layer 3 are aligned such that their long axes are substantially vertical to the surfaces of the panels 100 and 200 when there is no electric field. The liquid crystal layer 3 has negative dielectric anisotropy.

The thin film transistor array panel 100 and the color filter array panel 200 are assembled such that the pixel electrodes 190a and 190b precisely correspond to the color filter 230. When the two panels 100 and 200 are assembled, pixel areas are divided into a plurality of sub-areas by the edge of the first and second pixel electrode 190a and 190b and the cutouts 271 and 272. A liquid crystal region on each sub-area is called a domain. Thus, in one embodiment, a pixel region is divided into 4 domains by the cutouts 271 and 272. The domains have two parallel longest edges. The distance between two longest edges of each domain, e.g., the width of the domain, is preferably about 10~30 μm.

A pair of polarizers 12 and 22 is provided on the outer surfaces of the panels 100 and 200, respectively, such that the transmissive axis of each polarizer is crossed. Additionally the pair of polarizers is positioned so that at least one of the transmissive axes substantially parallels the gate lines 121.

The LCD may further include at least one retardation film (e.g., an optical element that produces, for example, full, half, or quarter wave phase changes of polarized light). The retardation film functions to compensate for the retardation of light caused by the LC layer 3.

In use, a common voltage is applied to the common electrode 270 and a data voltage is applied to the pixel electrodes 191a and 191b. The application of these voltages generates a primary electric field which is substantially perpendicular to the surfaces of the panels 100 and 200. In response to the electric field, the LC molecules rotate until their long axes are substantially perpendicular to the field direction.

The cutouts 271 and 272 of the common electrode 270 and the edges of the pixel electrodes 190a and 190b distort the primary electric field and give it a horizontal component which determines the tilt directions of the LC molecules. The horizontal component of the primary electric field adopts four different orientations, thereby forming four domains in the LC layer 3 with different LC molecule tilt directions. The horizontal component is substantially perpendicular to the first and second edges of the cutouts 271 and 272, and substantially perpendicular to the edge of the pixel electrode 190a and 190b. Accordingly, four domains having different tilt directions are formed in the LC layer 300. In an alternative embodiment, a plurality of protrusions formed on the common electrode 270 may be substituted for the cutouts 271 and 272 because the tilt directions of the LC molecules also can be controlled by a plurality of protrusions (not shown).

The direction of a secondary electric field due to the voltage difference between the pixel electrodes 190a and 190b is substantially perpendicular to each of the edges of the cutouts 271 and 272. Accordingly, the field direction of the secondary electric field coincides with that of the horizontal component of the primary electric field. Consequently, the secondary electric field between the pixel electrodes 190a and 190b enhances the tilt directions of the LC molecules.

Since the LCD performs inversion (i.e., inverting the polarity of an applied voltage) such as dot inversion, column inversion, etc., a secondary electric field that enhances the tilt directions of the LC molecules may be attained by supplying an adjacent pixel electrode with a data voltage having opposite polarity with respect to the common voltage. As a result, a direction of the secondary electric field generated between adjacent pixel electrodes is equivalent to the horizontal component of the primary electric field generated between the common and pixel electrodes. Thus, a secondary electric field between the adjacent pixel electrodes may be generated to enhance the stability of the domains.

In one embodiment, the tilt directions of all the domains form an angle of about 45 degrees with the gate lines 121, and the gate lines 121 are parallel to or perpendicular to the edges of the panels 100 and 200. Since a 45-degree intersection of the tilt directions and transmissive axes of the polarizers results in maximum transmittance, the polarizers can be attached such that the transmissive axes of the polarizers are parallel or perpendicular to the edges of the panels 100 and 200, thereby reducing the production cost.

It should be noted that increased resistance of the data lines 171 due to their bent structure can be compensated for by widening the data lines 171. Further, distortion of the electric field and increase of the parasitic capacitance due to increases in width of the data lines 171 can, in turn, be compensated for by increasing the size of the pixel electrodes 190a and 190b and by adapting a thick organic passivation layer.

In an embodiment of the present invention, the first pixel electrode 190a is supplied with an image data voltage through the TFT. However, the voltage of the second pixel electrode 190b varies depending on the voltage of the first pixel electrode 190a, because the second pixel electrode 190b is capacitively coupled with the first pixel electrode 190a. Therefore, the voltage of the second pixel electrode 190b with reference to the common voltage is always smaller than that of the first pixel electrode 190a.

As described above, when two pixel electrodes 190a and 190b having different voltages are disposed in a pixel area, the distortion of the gamma curve decreases by compensation of the two pixel electrodes 190a and 190b.

The reason that the voltage of the second pixel electrode 190b with reference to the common voltage will almost always be smaller than that of the first pixel electrode 190a will be described with reference to FIG. 5, which is a circuit diagram of the LCD shown in FIGS. 1, 2, 3 and 4.

Figure 5:
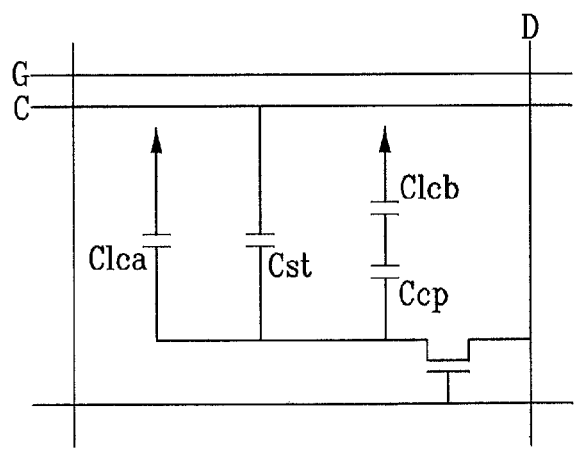
FIG. 5 is a circuit diagram of the LCD shown in FIGS. 1, 2, 3 and 4.

In FIG. 5, the abbreviation "Clca", stands for liquid crystal (LC) capacitance formed between the first pixel electrode 190a and the common electrode 270; and "Cst" stands for storage capacitance formed between the first pixel electrode 190a and the storage line 131. "Clcb" stands for liquid crystal (LC) capacitance formed between the second pixel electrode 190b and the common electrode 270 and Ccp stands for coupling capacitance formed between the first pixel electrode 190a and the second pixel electrode 190b.

The voltage Vb of the second pixel electrode 190b with reference to the common voltage and the voltage Va of the first pixel electrode 190a with reference to the common voltage are related by the voltage distribution law as follows:

$$Vb = Va \times [Ccp/(Ccp+Clcb)].$$

Since, Ccp/(Ccp+Clcb) is always smaller than 1, Vb is always smaller than Va. Persons skilled in the art will appreciate that the capacitance Ccp can be adjusted by overlapping area or distance between the second pixel electrode 190b and the coupling electrode 176. The overlapping area between the second pixel electrode 190b and the coupling electrode 176 can be easily adjusted by changing width of the coupling electrode 176. The distance between the second pixel electrode 190b and the coupling electrode 176 can be easily adjusted by changing the location of the coupling electrode 176. For example, in one embodiment of the invention, the coupling electrode 176 is formed on the same layer with the data line 171. In another embodiment, the coupling electrode 176 is formed on the same layer with the gate line 121. By making this change, the distance between the second pixel electrode 190b and the coupling electrode 176 is increased.

Depending on the embodiment the shape of coupling electrode 176 may be changed to have various forms. One example of such change will be described in the following description. Description of the following embodiment will focus on the distinguishing features from the embodiment of FIGS. 1 to 4. In order not to unnecessarily complicate, invention, the description of features previously described with reference to FIGS. 1-4 is omitted.

Figure 6:
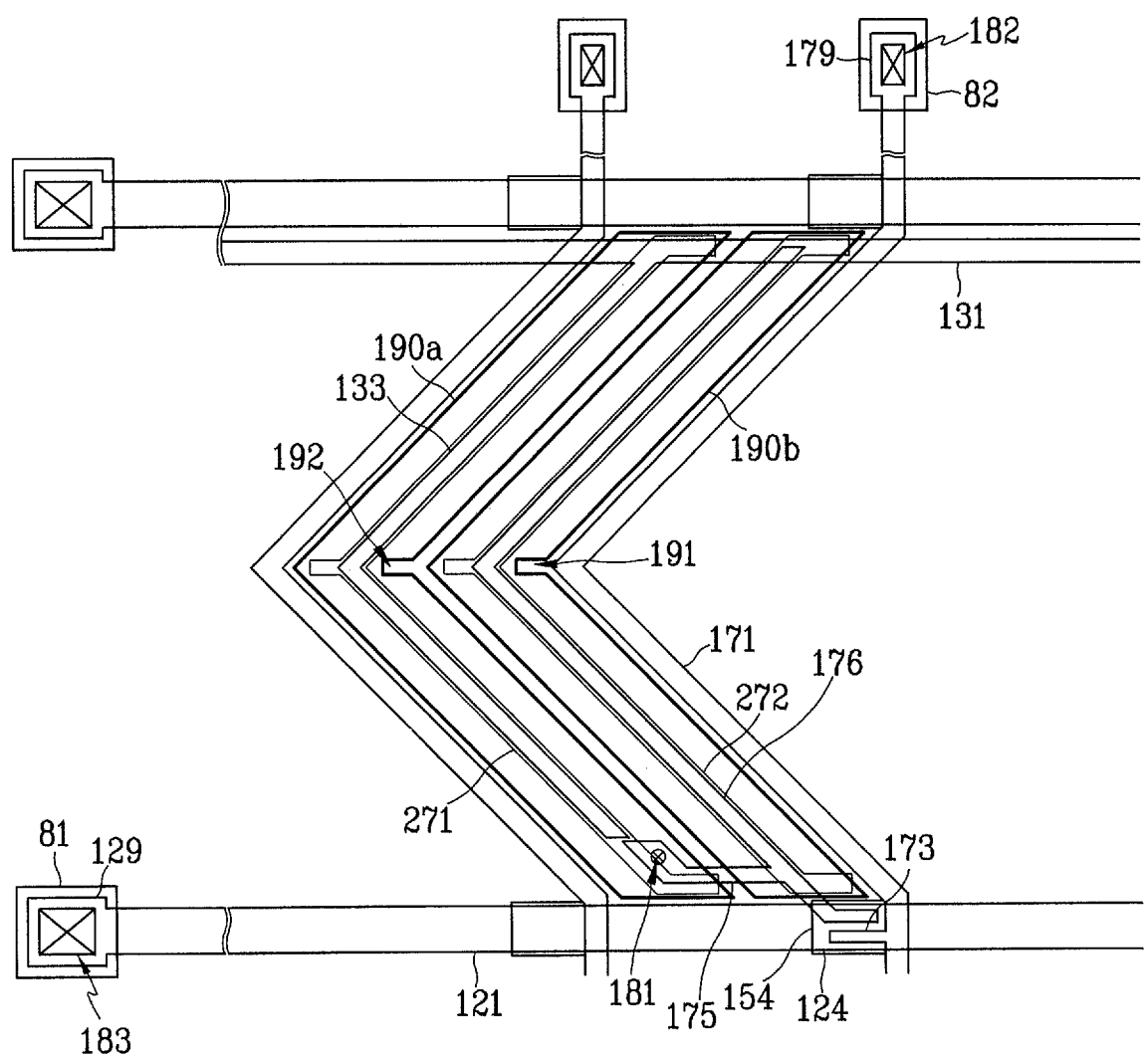
FIG. 6 is a top view of an LCD according to another embodiment of the present invention.

FIG. 6 is a top view of an LCD according to another embodiment of the present invention. Compared with the embodiment of FIGS. 1 to 4, that the embodiment of FIG. 6 exchanged the first pixel electrode 190a with the second pixel electrode 190b, and the site of the coupling electrode 176 with that of the storage electrode 133. That is, the first pixel electrode 190a and the storage electrode 133 are disposed on left side of a pixel area and the second electrode 190b and the coupling electrode 176 are disposed on right side of a pixel electrode.

Persons skilled in the art will appreciate that when a length ratio of the oblique portion and the longitudinal portion changes, the shape of a pixel area also changes. One example of this is described in FIGS. 7-9.

Figure 7:
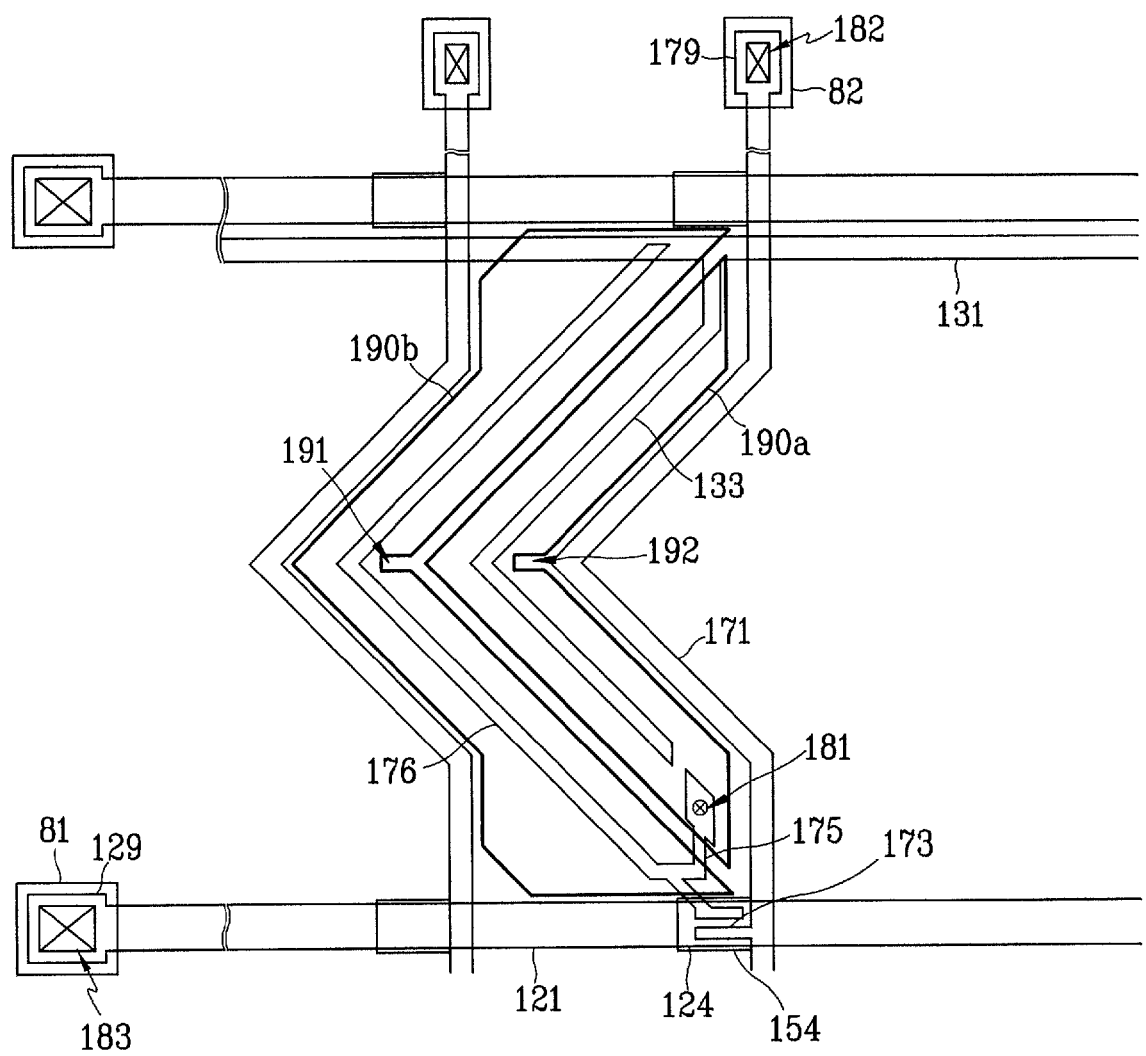
FIG. 7 is a top view of a thin film transistor array panel for a LCD according to another embodiment of the present invention.
Figure 8:
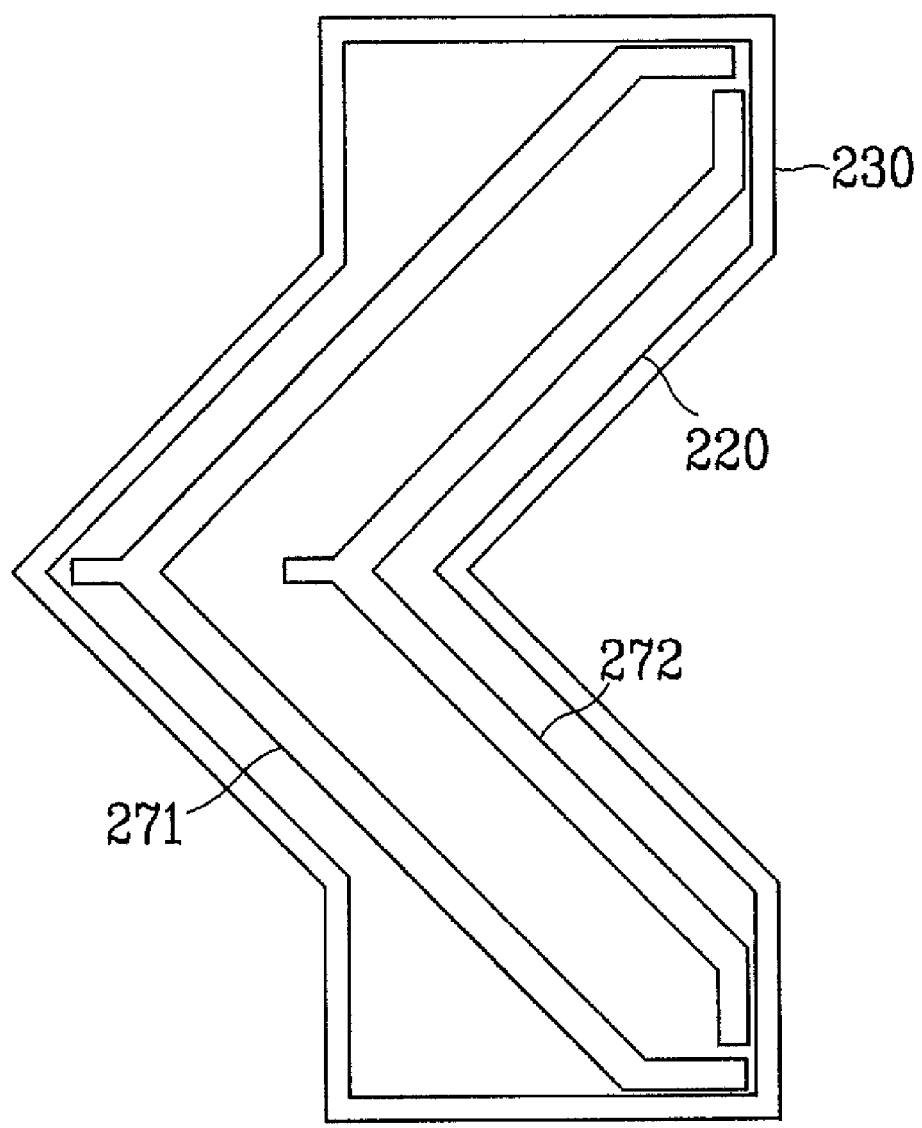
FIG. 8 is a top view of a common electrode panel for a LCD according to another embodiment of the present invention.
Figure 9:
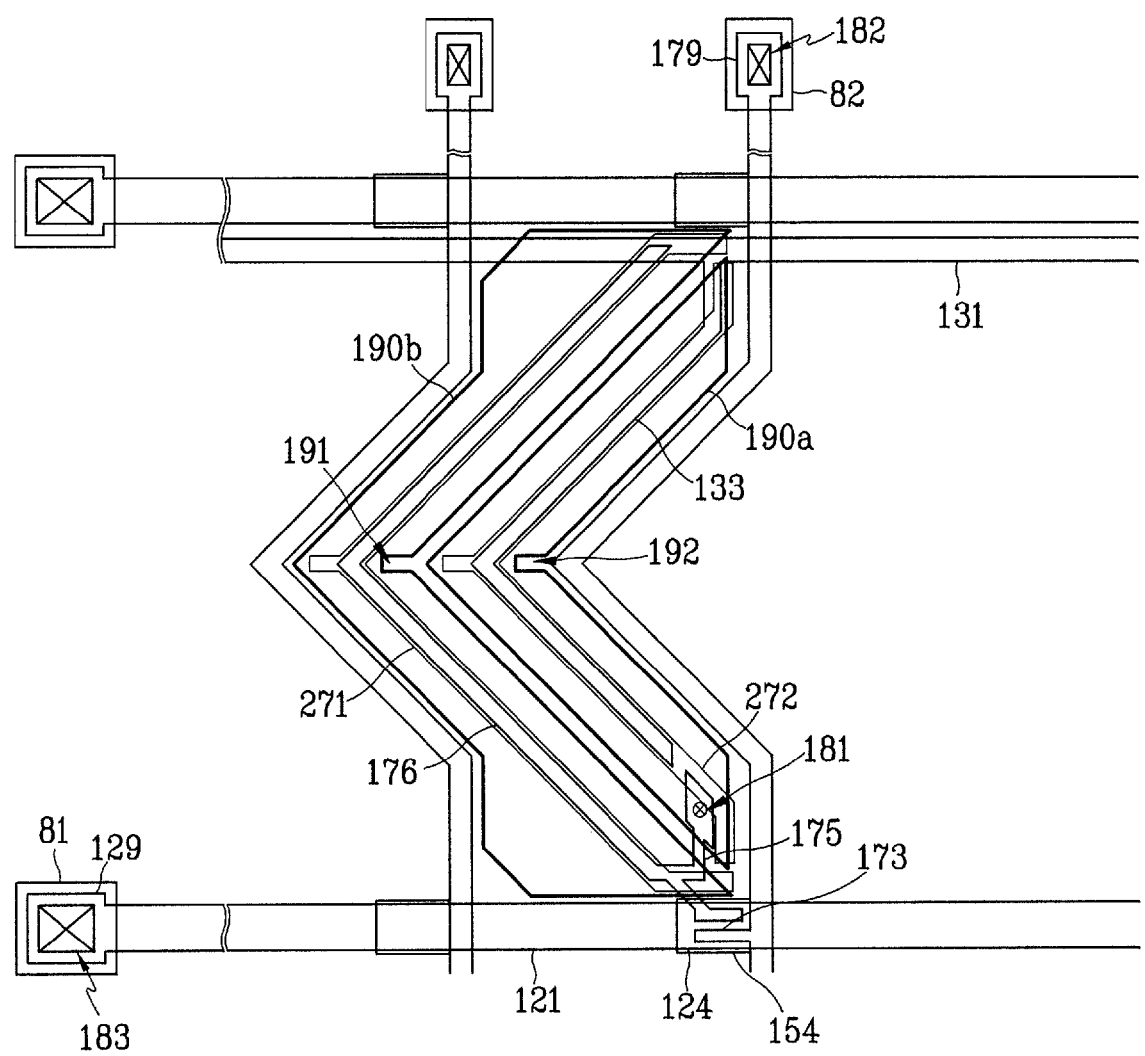
FIG. 9 is a top view of an LCD according to the embodiment shown in FIGS. 7 and 8.

FIG. 7 is a top view of a thin film transistor array panel for a LCD according to another embodiment of the present invention. FIG. 8 is a top view of a common electrode panel for a LCD according to another embodiment of the present invention. FIG. 9 is a top view of an LCD according to the embodiment shown in FIGS. 7 and 8.

In the embodiment of FIGS. 7 to 9, the data line 171 has enlarged longitudinal portions. Consequently, a pixel area includes a bent band portion and two rectangular portions that are respectively connected to both ends of the bent band portion. In one embodiment, it is preferable that the total length of the rectangular portions is longer than that of the bent band portion.

The shapes of the pixel electrodes 190a and 190b are formed to use all or substantially all the area of a pixel. For example, the first pixel electrode 190a may have two short edges that are substantially parallel the data line 171. The second pixel electrode 190b may have two short edges that are substantially parallel and adjacent the gate line 121. Additionally, the second pixel electrode 190b may have two enlarged end portions that fill all or substantially all of the pixel area.

The storage electrode 133 and the coupling electrode 176 may be respectively disposed to correspond with the center line of the first and second electrodes 190a and 190b. The common electrode 270 may have cutouts 271 and 272 that respectively correspond to coupling electrode 176 and storage electrode 133. As illustrated, both ends of the cutout 271 may be bent and extend to a predetermined length in a direction substantially parallel the gate line 121. Similarly, both ends of the cutout 272 may be bent and extend to a predetermined length in a direction substantially parallel with the data line 171. The centers of the cutouts 271 and 272 may also extend to a predetermined length and be substantially parallel the gate lines 121. As illustratively shown, the extending direction of the centers of the cutouts 271 and 272 may be opposite to that of the ends of the cutout 271.

The embodiment illustratively shown in FIGS. 7 to 9 diminishes the broken display of characters formerly caused by pixel areas having conventional bent band shapes.

In the embodiments described above, the semiconductor strips 151 have substantially the same planar shape as the data lines 171, the drain electrodes 175, and the coupling electrodes 176 as well as the underlying ohmic contacts 161, 165, and 166, except for the projections 154 where TFTs are provided. For example, the projections 154 include some exposed portions, which are not covered with the data lines 171 and the drain electrodes 175. Illustratively, such as portions may be located between the source electrodes 173 and the drain electrodes 175.

The structure shown in FIGS. 7 to 9 may be formed by a photo-etching process that uses a photoresist of varying thickness to form the intrinsic semiconductor 151, 155, and 156, the ohmic contacts 161, 165, and 166, and the layer of data lines 171.

In one embodiment, the thin film transistor array panels of the described embodiments may be manufactured using four photo-mask processes. A first photo-mask is used to pattern gate lines and storage electrode lines. A second photo-mask is used to pattern the intrinsic semiconductor layer, the ohmic contact layer, and the data line layer (after depositing the gate insulating layer, intrinsic semiconductor layer, ohmic contact layer, and data metal layer). A third photo-mask is used to form one or more contact holes in the passivation layer. A fourth photo-mask is used to form pixel electrodes and contact assistants. Illustratively, the second photo-mask may include light transmissive portions, light blocking portions, and half-transmissive portions that are disposed on channel portions of TFTs during the exposure.

The four photo-mask processes are described in detail in U.S. Pat. Nos. 6,335,276 and 6,531,392, which is hereby incorporated by reference in its entirety.

Figure 10:
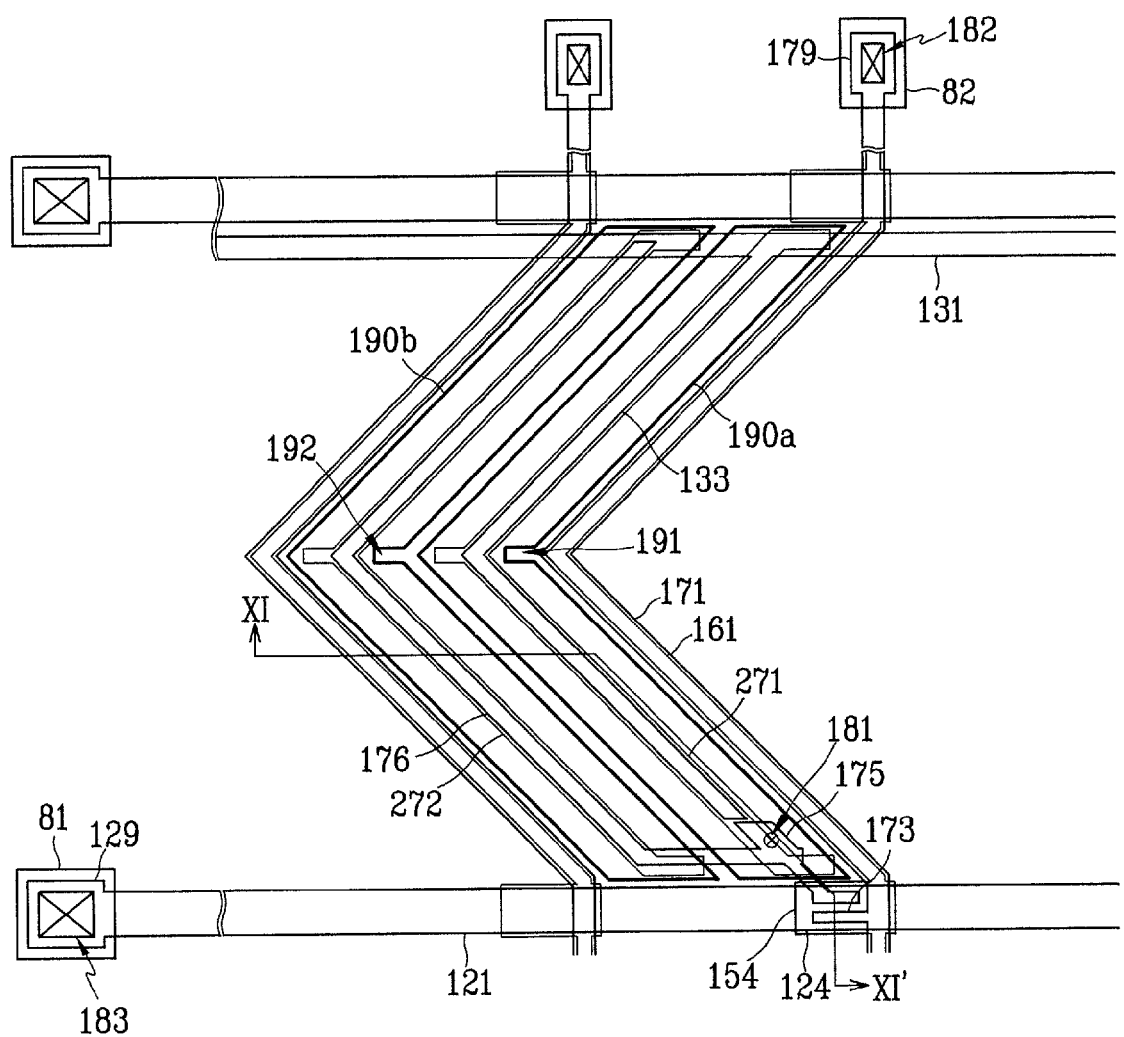
FIG. 10 is a top view of an LCD according to another embodiment of the present invention.
Figure 11:
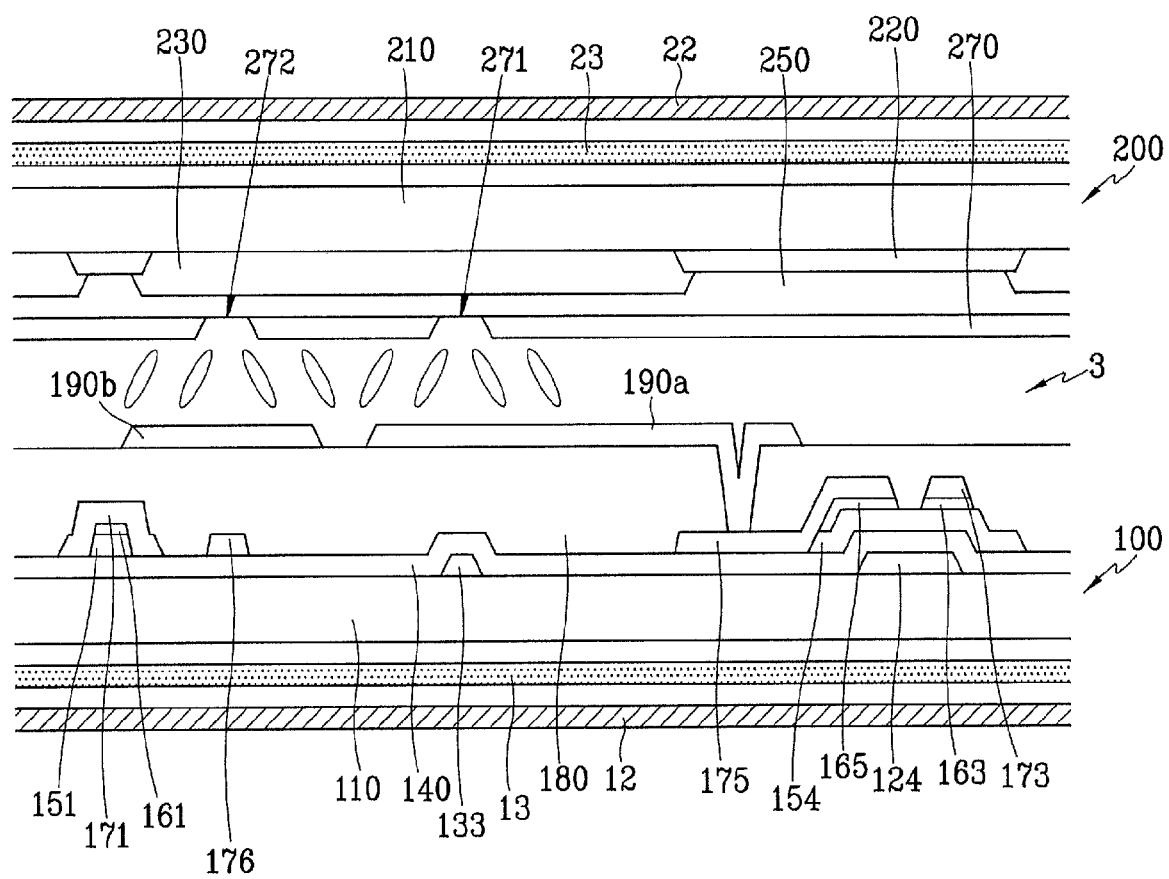
FIG. 11 is a sectional view of the LCD shown in FIG. 10 taken along the line XI-XI'.

FIG. 10 is a top view of an LCD according to another embodiment of the present invention. FIG. 11 is a sectional view of the LCD shown in FIG. 10 taken along the line XI-XI.

The embodiment illustratively shown in FIGS. 10 and 11 is distinguished from the embodiment of FIGS. 1 to 4 by the shapes of semiconductor strips 151, ohmic contacts 161 and 165, and data lines 171, drain electrodes 175, and coupling electrode 176. In the embodiment of FIGS. 10 and 11, the planar pattern of the data lines 171, drain electrodes 175, and coupling electrode 176 does not accord with that of the semiconductor strips 151 and ohmic contacts 161 and 165. For example, as shown in FIGS. 10 and 11, a width of the semiconductor strips 151 and a width of the ohmic contact strips 161 under the data lines 171 is narrower than that of the data lines 171. In this embodiment, no semiconductor and ohmic contacts, are formed under the coupling electrodes 176.

Such a structure may be formed using the following exemplary processes. For example, the semiconductor strips 151 and the ohmic contacts 161 and 165 may be formed by a photo-etching process. Thereafter, the data lines 171, drain electrodes 175, and coupling electrodes 176 may be formed by another photo-etching process. Illustratively, the structural differences between the embodiment of FIGS. 1 to 4 and the embodiment of FIGS. 10 and 11 arises from the difference of number of photo-etching process as used to pattern the semiconductor layer, the ohmic contact layer, and the data line layer, respectively.

Figure 12:
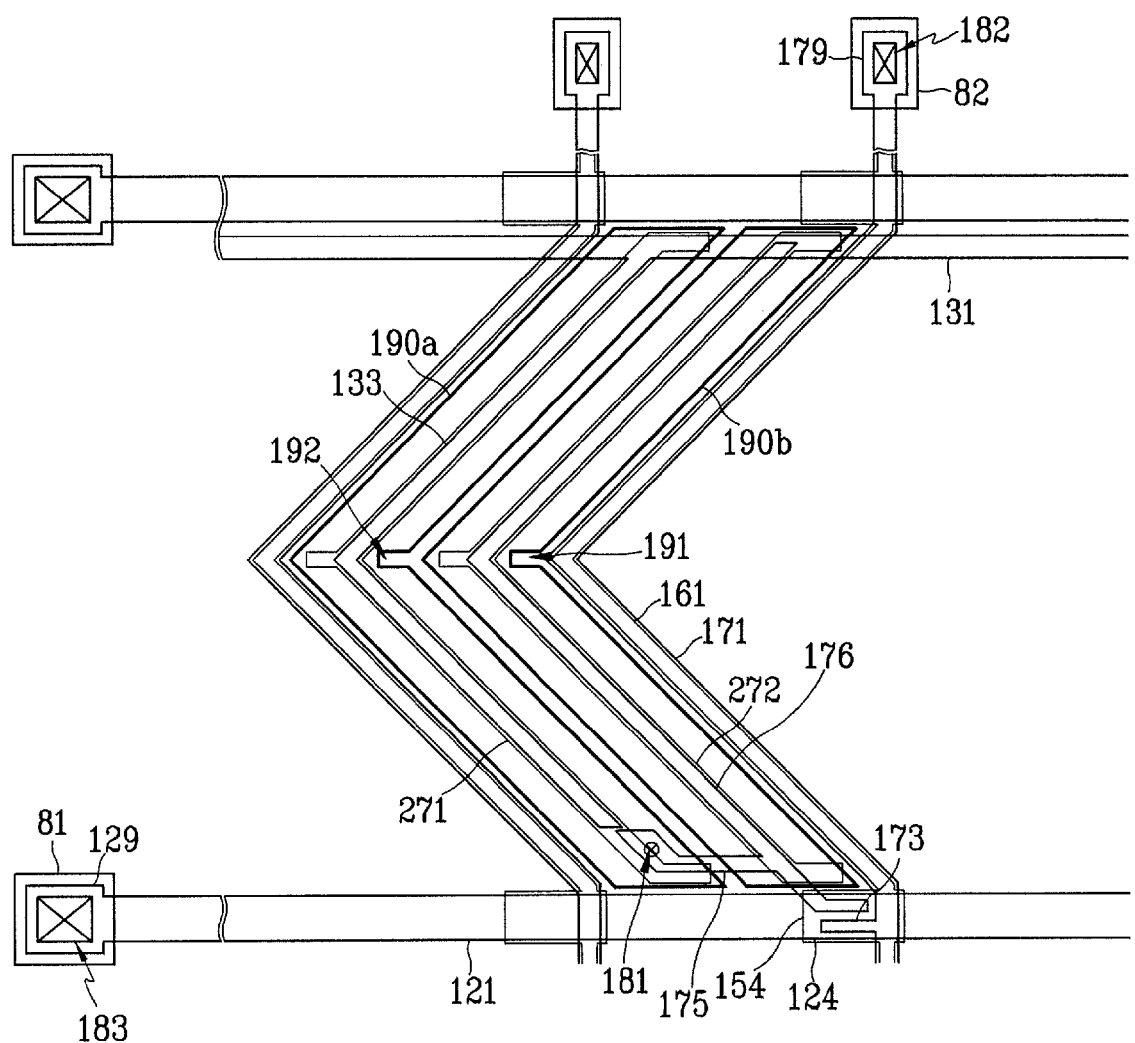
FIG. 12 is a top view of an LCD according to another embodiment of the present invention.

FIG. 12 is a top view of a LCD according to another embodiment of the invention. The embodiment of FIG. 12 is distinguished from the embodiment of FIG. 6 by shapes of semiconductor strips 151, ohmic contacts 161 and 165, and data lines 171, drain electrodes 175, and coupling electrode 176. In the embodiment of FIG. 12, the planar pattern of the data lines 171, drain electrodes 175, and coupling electrode 176 does not accord with that of the semiconductor strips 151 and ohmic contacts 161 and 165. For example, a width of the semiconductor strips 151 and the width of the ohmic contact strips 161 under the data lines 171 is narrower than that of the data lines 171. As shown, there are no semiconductor and ohmic contacts under the coupling electrodes 176.

The structural differences between the embodiment of FIG. 12 and the embodiment of FIG. 6 comes from the different number of photo-mask process as used to pattern the semiconductor layer, the ohmic contact layer, and the data line layer. In manufacturing the embodiment of FIG. 6, the semiconductor layer, the ohmic contact layer, and the data line layer are formed using one photo-mask process, but in manufacturing the embodiment of FIG. 12, they are formed using two photo-mask processes.

Figure 13:
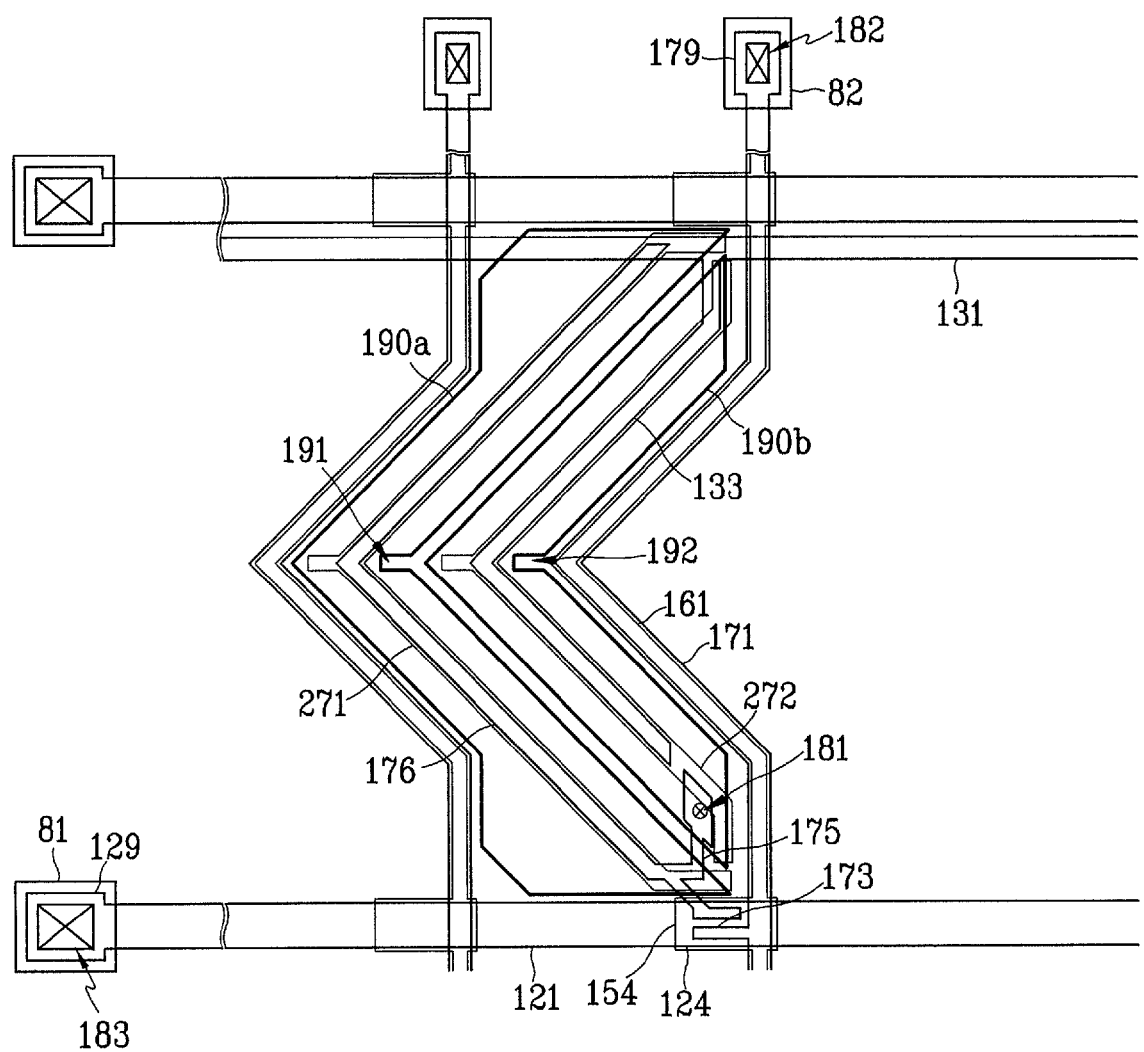
FIG. 13 is a top view of an LCD according to another embodiment of the present invention.

FIG. 13 is a top view of an LCD according to another embodiment of the present invention. The embodiment of FIG. 13 is distinguished from the embodiment of FIGS. 7 to 9 by shapes of semiconductor strips 151, ohmic contacts 161 and 165, and data lines 171, drain electrodes 175, and coupling electrode 176. In the embodiment of FIG. 13, the planar pattern of the data lines 171, drain electrodes 175, and coupling electrode 176 does not accord with that of the semiconductor strips 151 and ohmic contacts 161 and 165.

In the embodiment of FIG. 13, a width of the semiconductor strips 151 and n ohmic contact strips 161 under the data lines 171 is narrower than that of the data lines 171. As shown, there are no semiconductor and ohmic contacts under the coupling electrodes 176

The structural difference between the embodiment of FIG. 13 and the embodiment of FIGS. 7 to 9 comes from the difference of number of photo-mask processes used to pattern the semiconductor layer, the ohmic contact layer, and the data line layer. In manufacturing the embodiment of FIGS. 7 to 9, the semiconductor layer, the ohmic contact layer, and the data line layer are formed using one photo-mask process, but in manufacturing the embodiment of FIG. 13, they are formed using two photo-mask processes.

In the present invention, arrangement of the first pixel electrode 190a and the second pixel electrode 190b may be modified in various ways. Examples of such modifications are described below.

Figure 14:
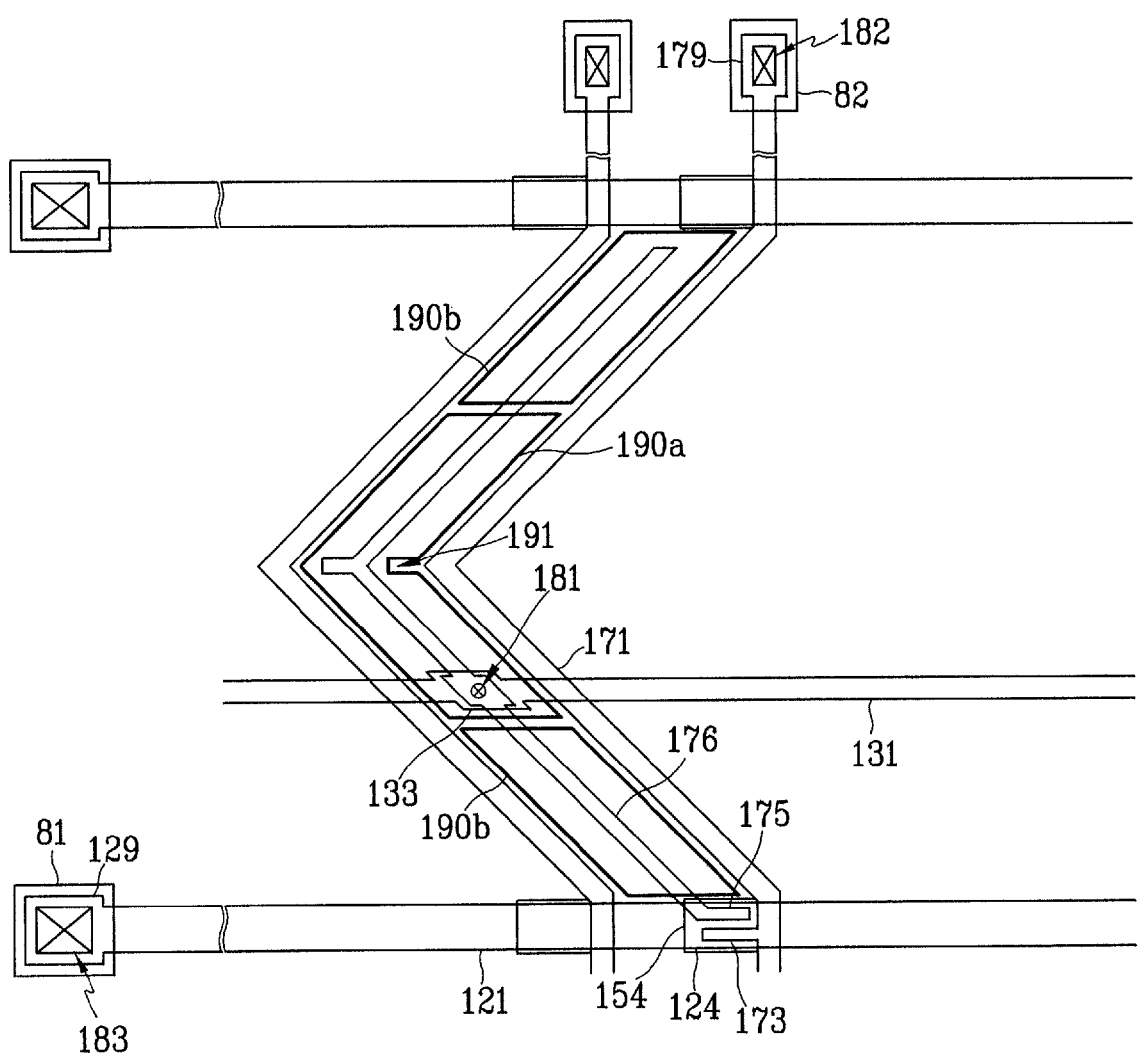
FIG. 14 is a top view of a thin film transistor array panel for a LCD according to another embodiment of the present invention.
Figure 15:
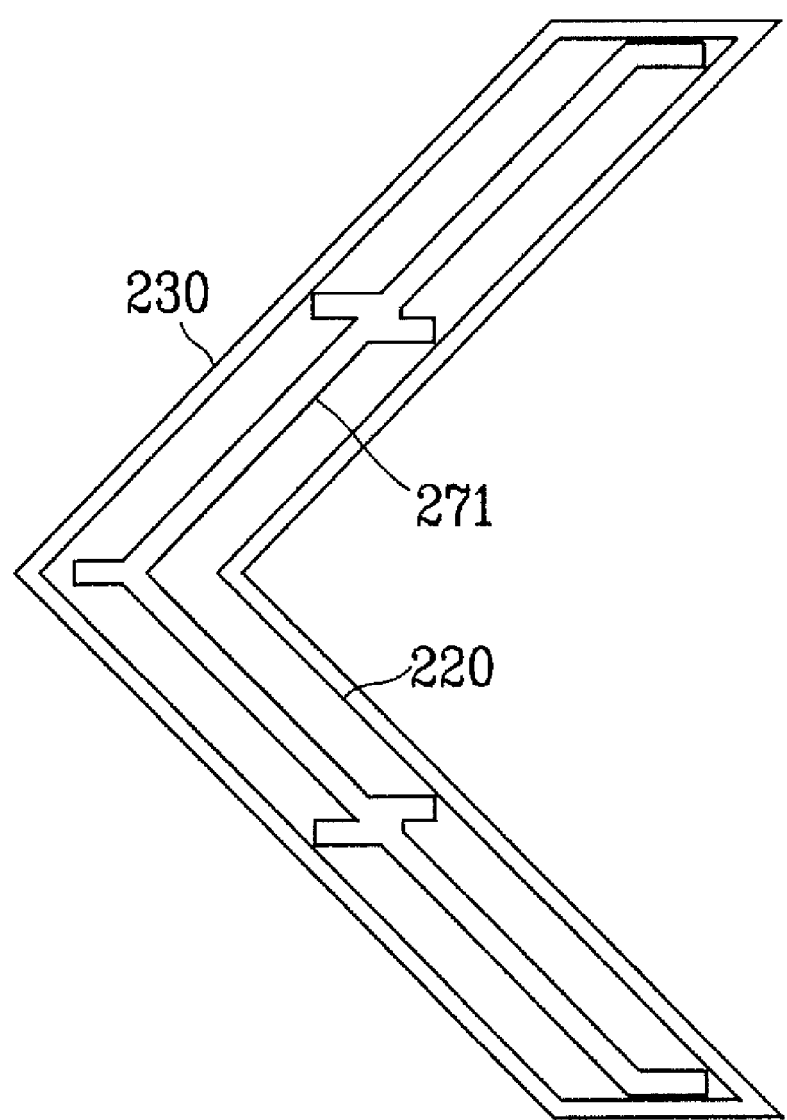
FIG. 15 is a top view of a common electrode panel for a LCD according to another embodiment of the present invention.
Figure 16:
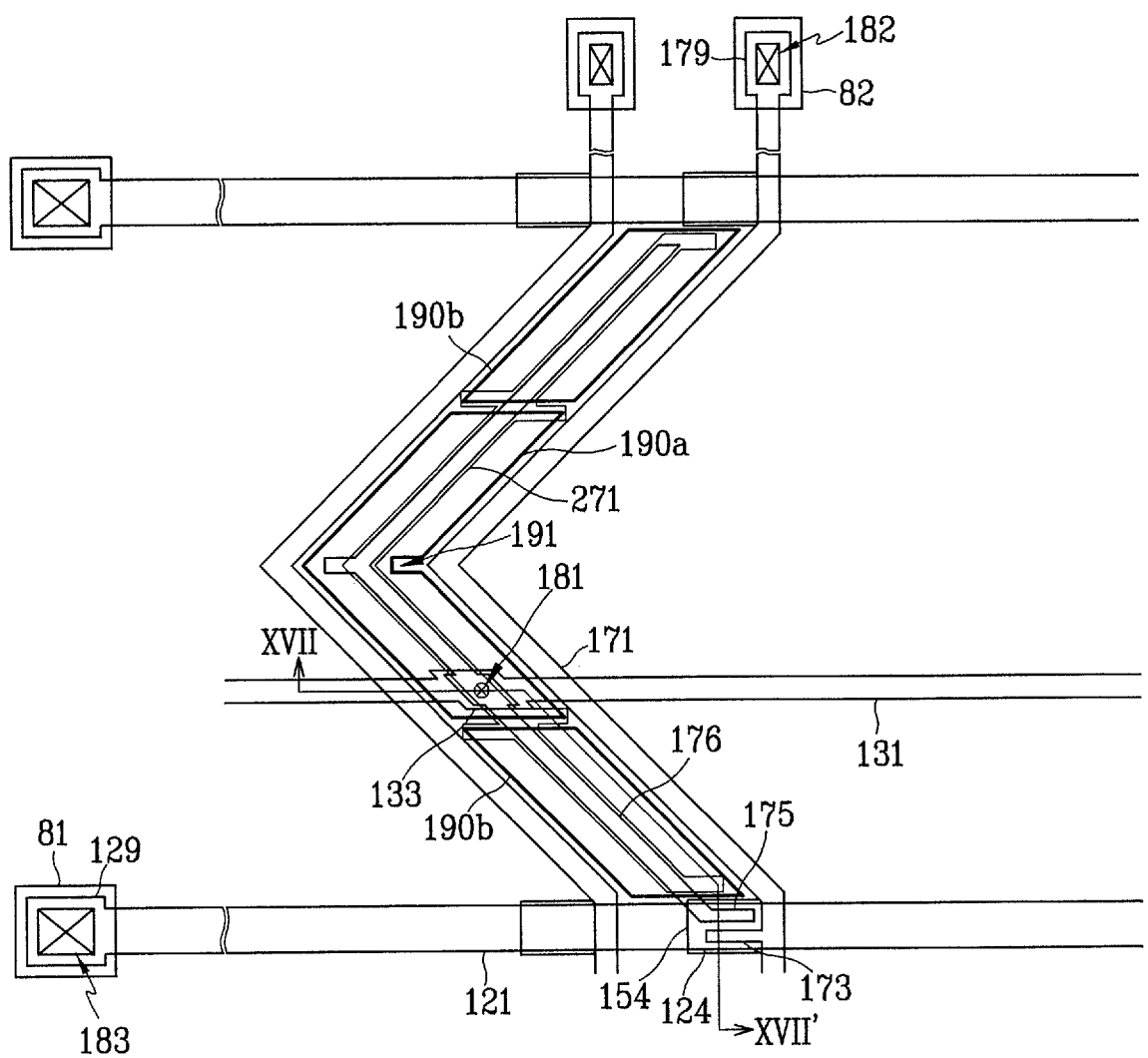
FIG. 16 is a top view of an LCD according to the embodiment shown in FIGS. 14 and 15.

FIG. 14 is a top view of a thin film transistor array panel for a LCD according to another embodiment of the invention. FIG. 15 is a top view of a common electrode panel for a LCD according to another embodiment of the invention. FIG. 16 is a top view of an LCD according to the embodiment shown in FIGS. 14 and 15.

A LCD according to the embodiment illustratively shown in FIGS. 14 to 17 includes a TFT array panel 100, a common electrode panel 200, and a LC layer 3 interposed between the panels 100 and 200 and containing a plurality of LC molecules aligned vertical to surfaces of the panels 100 and 200.

The TFT array panel 100 is now described in detail with reference to FIGS. 14, 16, and 17.

For example, a plurality of gate lines 121 and a plurality of storage electrode lines 131 are formed on an insulating substrate 110.

The gate lines 121 extend substantially in a transverse direction and are separated from each other and transmit gate signals. The gate line 121 has a plurality of gate electrodes 124 and gate pads 129 for connecting to external circuit.

Each storage electrode line 131 extends substantially in the transverse direction and includes a plurality of expansion forming storage electrodes 133. Illustratively, the storage electrodes 133 have a shape of parallelogram.

Each of the gate lines 121 and the storage electrode lines 131 may have a multi-layered structure that includes two films that have different physical characteristics from each other. Illustratively, each line may include a lower film (not shown) and an upper film (not shown). The upper film is preferably made of a low resistivity metal, such as, for example Al, a metal containing Al, or an Al alloy. A low resistivity metal is used to reduce signal delay or voltage drop in the gate lines 121 and the storage electrode lines 131. On the other hand, the lower film is preferably made of a material such as Cr, Mo, or a Mo alloy. However, any material that has good contact characteristics with indium tin oxide (ITO), indium zinc oxide (IZO) or similar materials may be used. A good exemplary combination of the lower film material and the upper film material is Cr and Al—Nd alloy. In such a combination, Cr forms the lower film and the Al—Nd alloy forms the upper film.

Referring to FIG. 14, the lateral sides of the gate lines 121 and the storage electrode lines 131 may be tapered. It tapered, the inclination angle of the lateral sides with respect to a surface of the substrate 110 is in a range of about 30-80 degrees.

Figure 17:
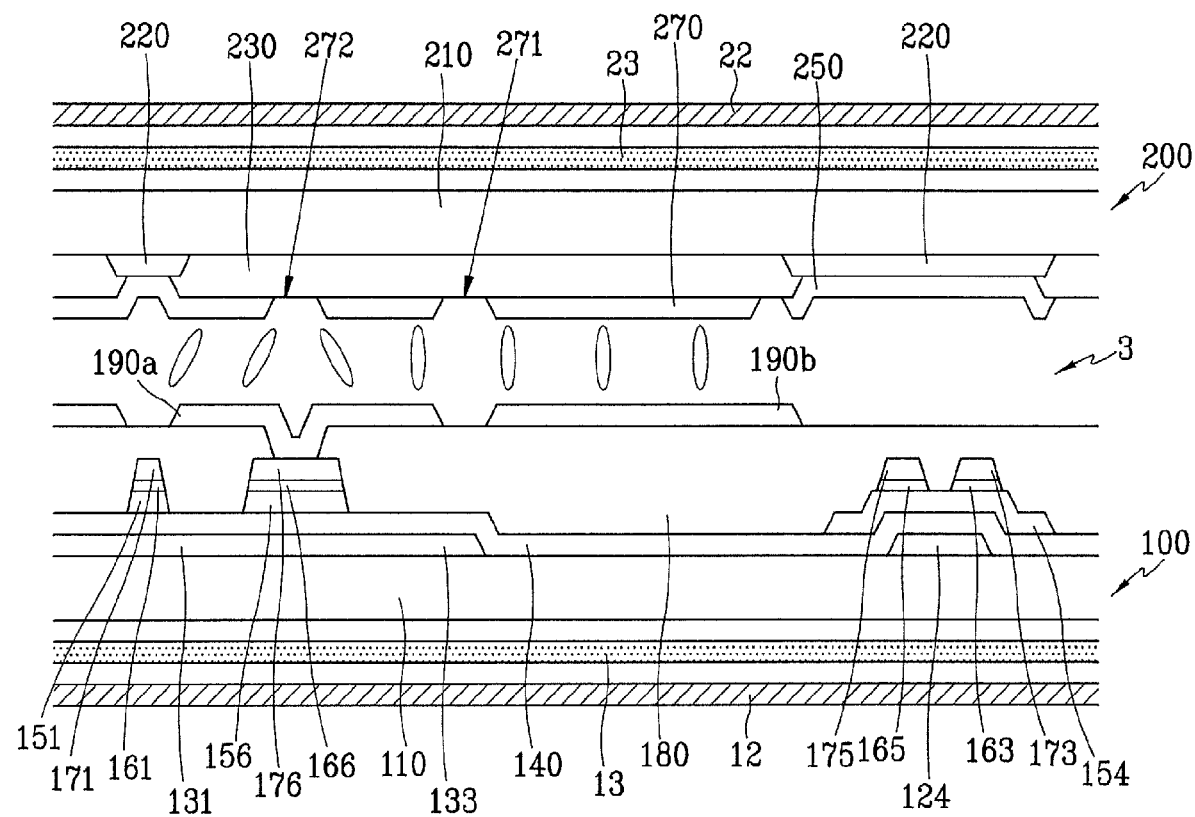
FIG. 17 is a sectional view of the LCD shown in FIG. 10 taken along the line XVII-XVII'.

Referring to FIG. 17, gate insulating layer 140 preferably made of silicon nitride (SiNx) may be formed on the gate lines 121 and the storage electrode lines 131.

A plurality of semiconductor strips 151 preferably made of hydrogenated amorphous silicon (abbreviated to "a-Si") is formed on the gate insulating layer 140. As illustratively shown, each semiconductor strip 151 extends substantially in the longitudinal direction and has a plurality of projections 154 branched out toward the gate electrodes 124. An extension 156 may be elongated from the projection 154.

Each of the semiconductor strips 151 is repeatedly bent and includes a plurality of pairs of oblique portions and a plurality of longitudinal portions. Two oblique portions making a pair are connected to each other to form a chevron and opposite ends of the pair of oblique portions are connected to respective longitudinal portions. In one embodiment, the oblique portions of the semiconductor strip make an angle about 45 degrees with the gate lines 121, and the longitudinal portions cross over the gate electrodes 124. Illustratively, a pair of oblique portions is about one to nine times longer than a longitudinal portion. That is, it occupies about 50-90 percent of the total length of the pair of oblique portions and the longitudinal portion.

The extension 156 includes a drain portion extended obliquely from the projection 154, a pair of oblique portions making an angle about 45 degrees with the gate lines 121, and a connector connecting the drain portion and an end of the pair of oblique portions.

A plurality of ohmic contact strips 161 and islands 165, preferably made of silicide or n+ hydrogenated a-Si heavily doped with n type impurity, may be formed on the semiconductor strips 151, extensions 156 and islands 154. Each ohmic contact strip 161 has a plurality of projections 163. In one embodiment, the projections 163 and the ohmic contact islands 165 are located in pairs on the projections 154 of the semiconductor strips 151.

The edge surfaces of the semiconductor strips 151 and the ohmic contacts 161, 165, and 166 are tapered, and the inclination angles of the edge surfaces of the semiconductor strips 151 and the ohmic contacts 161, 165, and 166 are preferably in a range of about 30-80 degrees.

A plurality of data lines 171, a plurality of drain electrodes 175, and a plurality of coupling electrodes 176 are formed on the ohmic contacts 161, 165, and 166 and the gate insulating layer 140, respectively.

Designed to transmit data voltages, the data lines 171 extend substantially in the longitudinal direction and intersect both the gate lines 121 and the storage electrode lines 131. Each data line 171 is bent repeatedly and includes a plurality of pairs of oblique portions and a plurality of longitudinal portions. In one embodiment, each pair of oblique portions is connected to form a chevron. The opposite ends of each pair of oblique portions are connected to respective longitudinal portions. The oblique portions of the data lines 171 make an angle of about 45 degrees with the gate lines 121, and the longitudinal portions cross over the gate electrodes 124. The length of a pair of oblique portions is about one to nine times the length of a longitudinal portion. That is, it occupies about 50-90 percent of the total length of the pair of oblique portions and the longitudinal portion. When an LCD is configured in this manner, pixel areas defined by crossing of the gate line 121 and the data line 171 appear to have a bent strip shape.

As shown in FIG. 1, each data line 171 may include a data pad 179 that is wider than the data line for contacting another layer or an external device. A plurality of branches of each data line 171 may project toward drain electrodes 175 to form a plurality of source electrodes 173. As shown, pairs of source electrodes 173 and drain electrodes 175 are separated from each other and positioned on a gate electrode 124. In one embodiment, the combination of a gate electrode 124, a source electrode 173, and a drain electrode 175, together with a projection 154 of a semiconductor strip 151, forms a TFT having a channel formed in the projection 154 disposed between the source electrode 173 and the drain electrode 175.

A plurality of coupling electrodes 176 are formed on the same layer and made of the same material as the drain electrode 175. The coupling electrodes 176 are connected to the drain electrodes 175 and extend from the drain electrode 175. A first portion of a coupling electrode 176 makes an angle of about 135 degrees with a gate line 121 and the second portion of the coupling electrode 176 makes an angle of 45 degrees with the gate line 121. The first and second portions of coupling electrode 176 are substantially parallel corresponding oblique portions of the data line 171.

As shown, the coupling electrode 176 may include an expansion connector that overlaps the storage electrode 133. The expansion of the coupling electrode 176 increases storage capacitance and widens a contact area with the first pixel electrode 190a.

Each of data lines 171, the drain electrodes 175, and the coupling electrodes 176 may have a multi-layered structure that includes two films having different physical characteristics. For example, each data line drain electrode, and coupling electrode may include a lower film (not shown) and an upper film (not shown). In one embodiment, the upper film may be preferably made of low resistivity metal that includes, for example, Al or an Al alloy. A low resistivity material is used to reduce signal delay or voltage drop in the data lines. On the other hand, the lower film may be preferably made of a material that has good contact characteristics with other materials such as indium tin oxide (ITO), indium zinc oxide (IZO) or similar materials. Illustrative lower film materials include but are not limited to Cr, Mo, or a Mo alloy. A good exemplary combination of the lower film material and the upper film material is Cr and Al—Nd alloy. In such a combination, Cr forms the lower material and an Al—Nd alloy forms the upper film.

Additionally, the lateral sides of each of the data lines 171, the drain electrodes 175, and the coupling electrodes 176 may be tapered. If tapered, the inclination angle of the lateral sides with respect to a surface of the substrate 110 is in the range of about 30-80 degrees.

A passivation layer 180 may be formed on the data lines 171, the drain electrodes 175, and the coupling electrodes 176. In one embodiment, the passivation layer 180 is preferably made of a flat photosensitive organic material and low dielectric insulating material having a dielectric constant under 4.0. Exemplary materials used to form passivation layer 180 include, but are not limited to a-Si:C:O and a-Si:O: F, each formed by plasma enhanced chemical vapor deposition (PECVD). Alternatively, an inorganic material such as silicon nitride, silicon oxide or similar material may be used.

In one embodiment, passivation layer 180 includes a plurality of contact holes 181 and 182 that expose the drain electrodes 175 and the expansion connectors 179 of the data lines 171, respectively. Additionally, the passivation layer 180 and the gate insulating layer 140 have a plurality of contact holes 183 that expose the gate pads 129 of the gate lines 121. Illustratively, the sidewalls of the contact holes 181, 182, and 183 may make an angle of about 30-85 degrees with respect to the surface of the substrate 110 and may also include one or more stepped portions. Depending on the embodiment, the contact holes 181, 182, and 183 may have various planar shapes, such as a rectangular or circular shape. In one embodiment, the area of each contact hole 181, 182, and 183 is preferably greater than or equal to about 0.5 mm×15 µm and not larger than about 2 mm×60 µm.

In one embodiment, a plurality of pairs of pixel electrodes 190a and 190b and a plurality of contact assistants 81 and 82, which are preferably made of ITO, IZO or Cr, are formed on the passivation layer 180.

Referring to FIG. 14 and FIG. 17, a first pixel electrode 190a and a second pixel electrode 190b are shown. In one embodiment, the first pixel electrode 190a has a bent band shape that follows the shape of the pixel area. Pixel electrode 190a also includes a cutout 191. The second pixel electrode 190b includes two separated parallelograms. As illustratively shown, the first pixel electrode 190b may be disposed between the two parallelograms of the second pixel electrode 190b. In this configuration, the first pixel electrode 190b and the second pixel electrode 190b occupy substantially the same area.

The first pixel electrode 190a physically and electrically connects to the coupling electrodes 176 through the contact holes 181. The second pixel electrode 190b is physically and electrically floated, but overlaps the coupling electrode 176 to form coupling capacitance with the first pixel electrodes 190a. Therefore, the voltage of the second pixel electrode 190b depends on the voltage of the first pixel electrode 190a. The voltage of the second pixel electrode 190b with respect to the common voltage is always smaller than that of the first pixel electrode 190a. Therefore, applied voltage at the center of a pixel area is higher than that applied to both sides of a pixel area. In the present embodiment, the coupling electrode 176 play a role of passage for image signal from a thin film transistor to the first pixel electrode 190a as well as coupling of the first pixel electrode 190a and the second pixel electrode 190b. In the embodiment illustrated, the coupling electrode 176 routes an image signal from a thin film transistor to the first pixel electrode 190a. It also couples the first pixel electrode 190a tu to the second pixel electrode 190b.

In one embodiment, it shows that when a pixel area includes two sub-areas with somewhat different electric fields, a mutual compensation in the two subareas improves the lateral visibility.

The common electrode panel 200 is now described with respect to FIGS. 15, 16, and 17. Referring to FIG. 15, black matrix 220 for preventing light leakage is formed on an insulating substrate 210 such as transparent glass. A plurality of red, green and blue color filters 230 are formed on the black matrix and the substrate 210 and extend substantially along the columns of the pixel areas and are periodically bent as the shape of the pixel areas bends. In other words, the color filters 230 extend substantially in the longitudinal direction along pixel columns defined by black matrix 220 and are periodically bent along the shape of pixels area. As shown in FIG. 4, an overcoat 250 is formed on the color filters 230 and the black matrix 220. A common electrode 270, preferably made of transparent conductive material such as ITO and IZO, may be formed on the overcoat 250. In one embodiment, the common electrode 270 includes a plurality of cutouts 271 and 272. The cutouts 271 and 272 may function as domain control means and are preferably about 9~12 µm wide. When organic protrusions replace the cutouts 271, the organic protrusions are preferably about 5~10 µm wide. As shown in FIG. 4, each pair of cutouts 271 and 272 are disposed in a pixel area and is bent along the shape of pixel area. The cutouts 271 and 272 are respectively disposed to divide the first pixel electrodes 190a and the second pixel electrode 190b into right half portions and left half portions. Both ends of the cutouts 271 and 272 are bent and extend to a predetermined length in a direction that substantially parallels the gate lines 121. Centers of the cutouts 271 and 272 also extend to a predetermined length and are substantially parallels the gate lines 121. In one embodiment, the extending direction of the centers of the cutouts 271 and 272 is opposite to that of the ends of the cutouts 271 and 272.

Referring to FIG. 15, a cutout 271 of common electrode 270 may be disposed in a pixel area and is bent along the shape of the pixel area. The cutout 271 may be disposed to divide the first pixel electrode 190a and the second pixel electrode 190b into right half portions and left half portions. Both ends of the cutout 271 may be bent and extend to a predetermined length in a direction parallel with the gate line 121. Centers of the cutout 271 may also extend to a predetermined length and be substantially parallel the gate line 121. As shown the extending direction of the center of the cutout 271 may be opposite to that of the ends of the cutout 271. Additionally, the cutout 271 may also have branches parallel the gate line 121 at points ¼ length and ¾ length as measured from one end of the cutout 271.

The LCD includes a TFT array panel 100, a color filter array panel 200 facing the TFT array panel 100 and separated by a predetermined gap, and a liquid crystal layer 3 filled in the predetermined gap.

The LC molecules in the LC layer 3 are aligned such that their long axes are substantially vertical to the surfaces of the panels 100 and 200 when there is no electric field. The liquid crystal layer 3 has negative dielectric anisotropy.

The thin film transistor array panel 100 and the color filter array panel 200 are assembled such that the pixel electrodes 190a and 190b precisely correspond to the color filter 230. When the two panels 100 and 200 are assembled, pixel areas are divided into a plurality of sub-areas by the edge of the first and second pixel electrode 190a and 190b and the cutouts 271 and 272. A liquid crystal region on each sub-area is called a domain. Thus, in one embodiment, a pixel region is divided into 4 domains by the cutouts 271 and 272. The domains have two parallel longest edges. The distance between two longest edges of each domain, e.g., the width of the domain, is preferably about 10~30 µm.

A pair of polarizers 12 and 22 is provided on the outer surfaces of the panels 100 and 200, respectively, such that the transmissive axis of each polarizer is crossed. Additionally the pair of polarizers is positioned so that at least one of the transmissive axes substantially parallels the gate lines 121.

The LCD may further include at least one retardation film (e.g., an optical element that produces, for example, full, half, or quarter wave phase changes of polarized light). The retardation film functions to compensate for the retardation of light caused by the LC layer 3.

In use, a common voltage is applied to the common electrode 270 and a data voltage is applied to the pixel electrodes 191a and 191b. The application of these voltages generates a primary electric field which is substantially perpendicular to the surfaces of the panels 100 and 200. In response to the electric field, the LC molecules rotate until their long axes are substantially perpendicular to the field direction.

The cutouts 271 and 272 of the common electrode 270 and the edges of the pixel electrodes 190a and 190b distort the primary electric field and give it a horizontal component which determines the tilt directions of the LC molecules. The horizontal component of the primary electric field adopts four different orientations, thereby forming four domains in the LC layer 3 with different LC molecule tilt directions. The horizontal component is substantially perpendicular to the first and second edges of the cutouts 271 and 272, and substantially perpendicular to the edge of the pixel electrode 190a and 190b. Accordingly, four domains having different tilt directions are formed in the LC layer 300. In an alternative embodiment, a plurality of protrusions formed on the common electrode 270 may be substituted for the cutouts 271 and 272 because the tilt directions of the LC molecules also can be controlled by a plurality of protrusions (not shown).

The direction of a secondary electric field due to the voltage difference between the pixel electrodes 190a and 190b is substantially perpendicular to each of the edges of the cutouts 271 and 272. Accordingly, the field direction of the secondary electric field coincides with that of the horizontal component of the primary electric field. Consequently, the secondary electric field between the pixel electrodes 190a and 190b enhances the tilt directions of the LC molecules.

Since the LCD performs inversion (i.e., inverting the polarity of an applied voltage) such as dot inversion, column inversion, etc., a secondary electric field that enhances the tilt directions of the LC molecules may be attained by supplying an adjacent pixel electrode with a data voltage having opposite polarity with respect to the common voltage. As a result, a direction of the secondary electric field generated between adjacent pixel electrodes is equivalent to the horizontal component of the primary electric field generated between the common and pixel electrodes. Thus, a secondary electric field between the adjacent pixel electrodes may be generated to enhance the stability of the domains.

In one embodiment, the tilt directions of all the domains form an angle of about 45 degrees with the gate lines 121, and the gate lines 121 are parallel to or perpendicular to the edges of the panels 100 and 200. Since a 45-degree intersection of the tilt directions and transmissive axes of the polarizers results in maximum transmittance, the polarizers can be attached such that the transmissive axes of the polarizers are parallel or perpendicular to the edges of the panels 100 and 200, thereby reducing the production cost.

As described above, when two pixel electrodes 190a and 190b having different voltages are disposed in a pixel area, the distortion of the gamma curve decreases by compensation of the two pixel electrodes 190a and 190b. This results in improved viewing angle and quality of picture.

Figure 18:
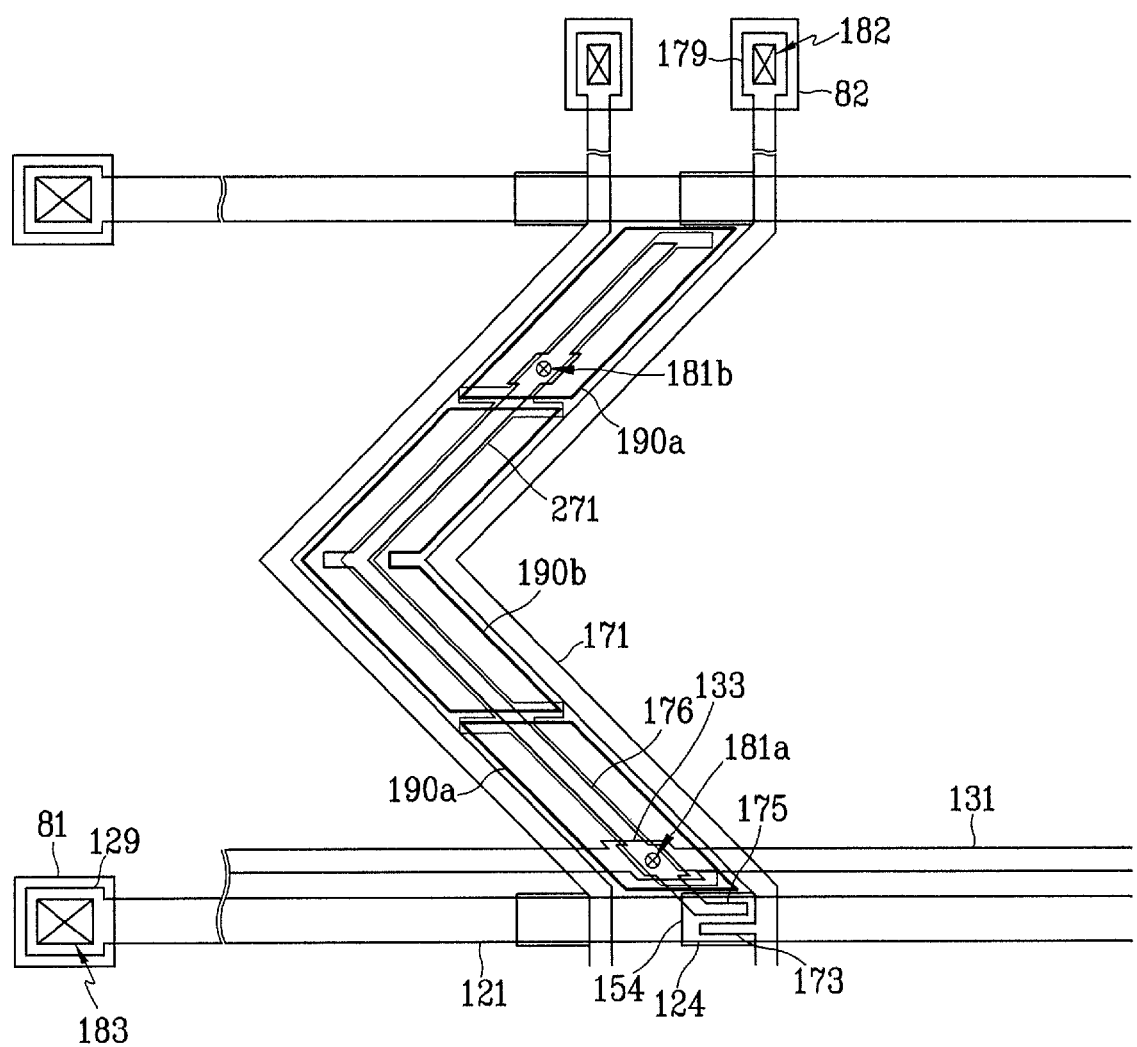
FIG. 18 is a top view of an LCD according to another embodiment of the present invention.

FIG. 18 is a top view of an LCD according to another embodiment of the present invention.

When the compared with the embodiment of FIGS. 14 to 17, the embodiment of FIG. 18 switched the first pixel electrode 190a with the second pixel electrode 190b and changed the site of the expansion of the coupling electrode 176. The site of the storage electrode line 131 is moved downside. That is, the first pixel electrode 190a has two separate portions. The second pixel electrode 190b has bent band shape and is disposed between the two portions of the first pixel electrode 190a. The coupling electrode 176 has two expansions to be respectively connected with the two portions of the first pixel electrode 190a.

The embodiments of FIGS. 14 to 17 and FIG. 18 show TFT array panels manufactured using four photo-mask processes. However, persons skilled in the art will understand that the embodiments shown in FIGS. 14, 17 and FIG. 18 may be adapted to TFT array panels manufactured through five photo-mask processes.

In the above described embodiments, cutouts formed in the common electrode may function as domain control means. Alternatively, however, protrusions formed on the common electrode may replace the cutouts. When protrusions are used as domain control means, the planar pattern of the protrusions may be the same as that of the cutouts.

As described above, to improve lateral visibility and aperture ratio, the pixel areas are formed to have a bent band shape and each pixel area has two separated pixel electrodes which are applied with different voltages from each other. Additionally, the bent band shape of the pixel area increases the pixel area's degree of spatial dispersibility. However, the increased spatial dispersibility may create a broken image when a small images such as individual alphanumerical characters are displayed. Embodiments for alleviating this problem are described with reference to FIGS. 19-22, as follow.

Figure 19:
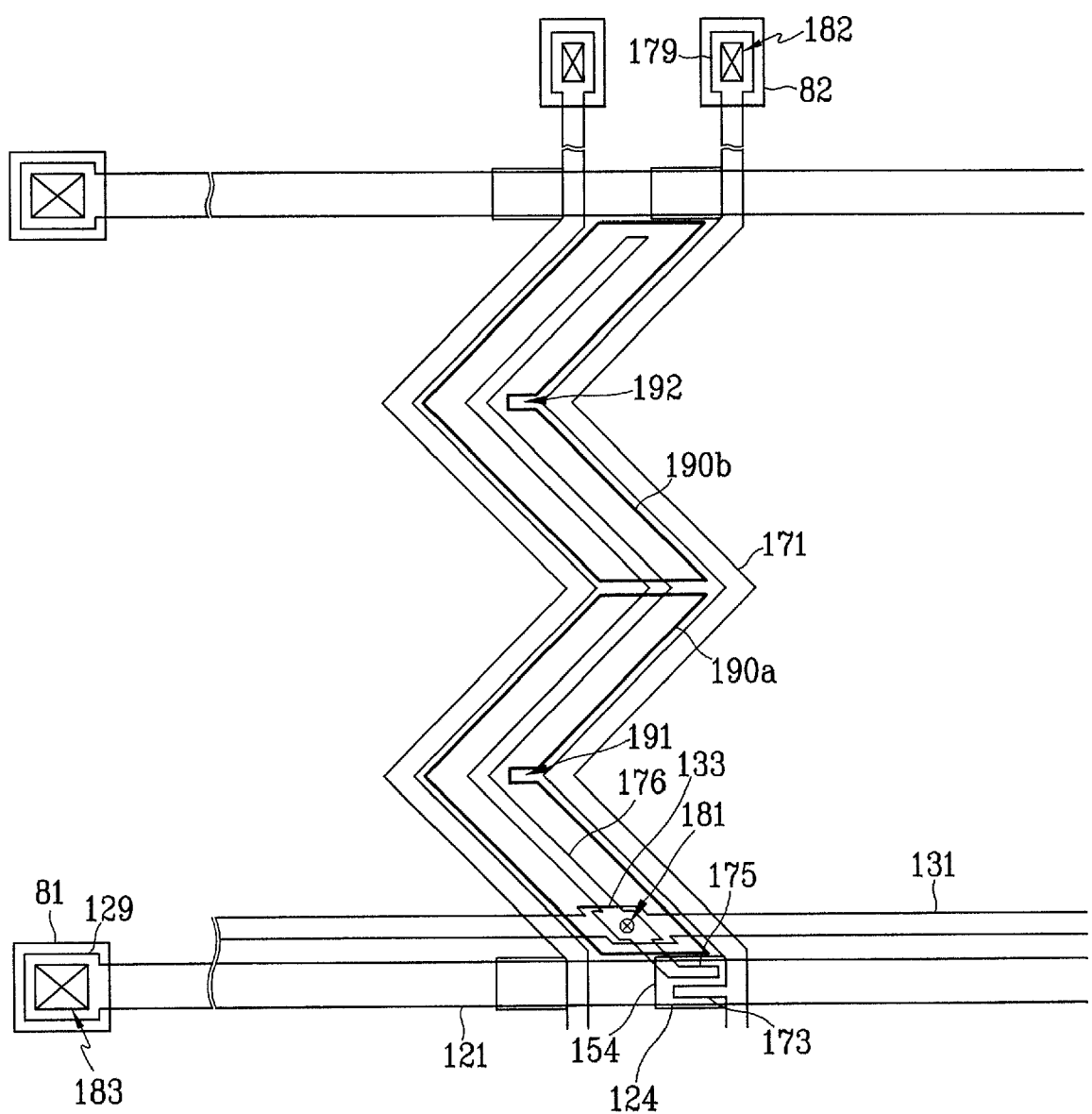
FIG. 19 is a top view of a thin film transistor array panel for a LCD according to another embodiment of the present invention.
Figure 20:
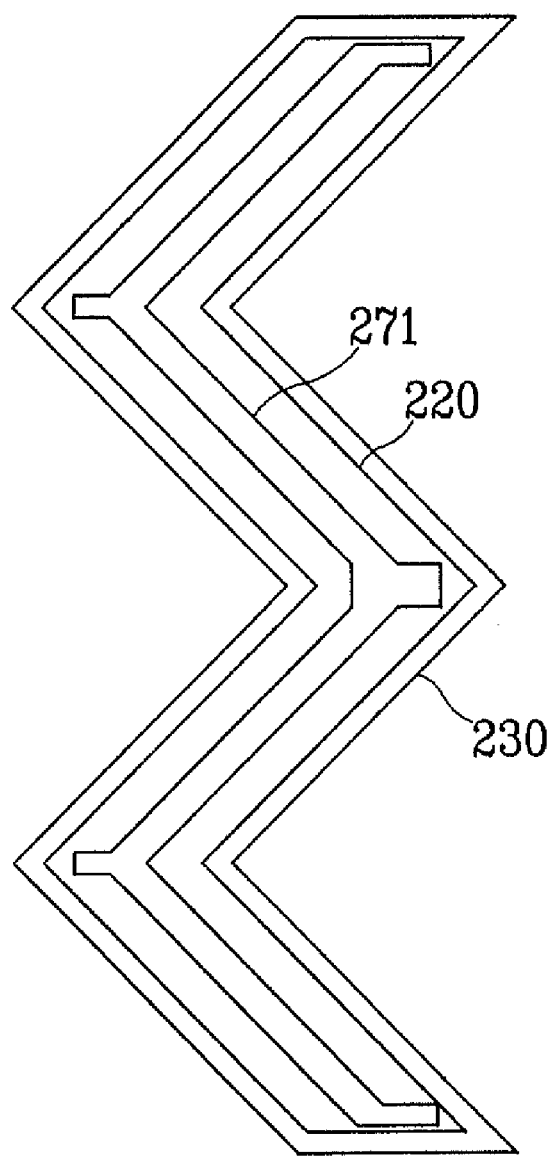
FIG. 20 is a top view of a common electrode panel for a LCD according to another embodiment of the present invention.
Figure 21:
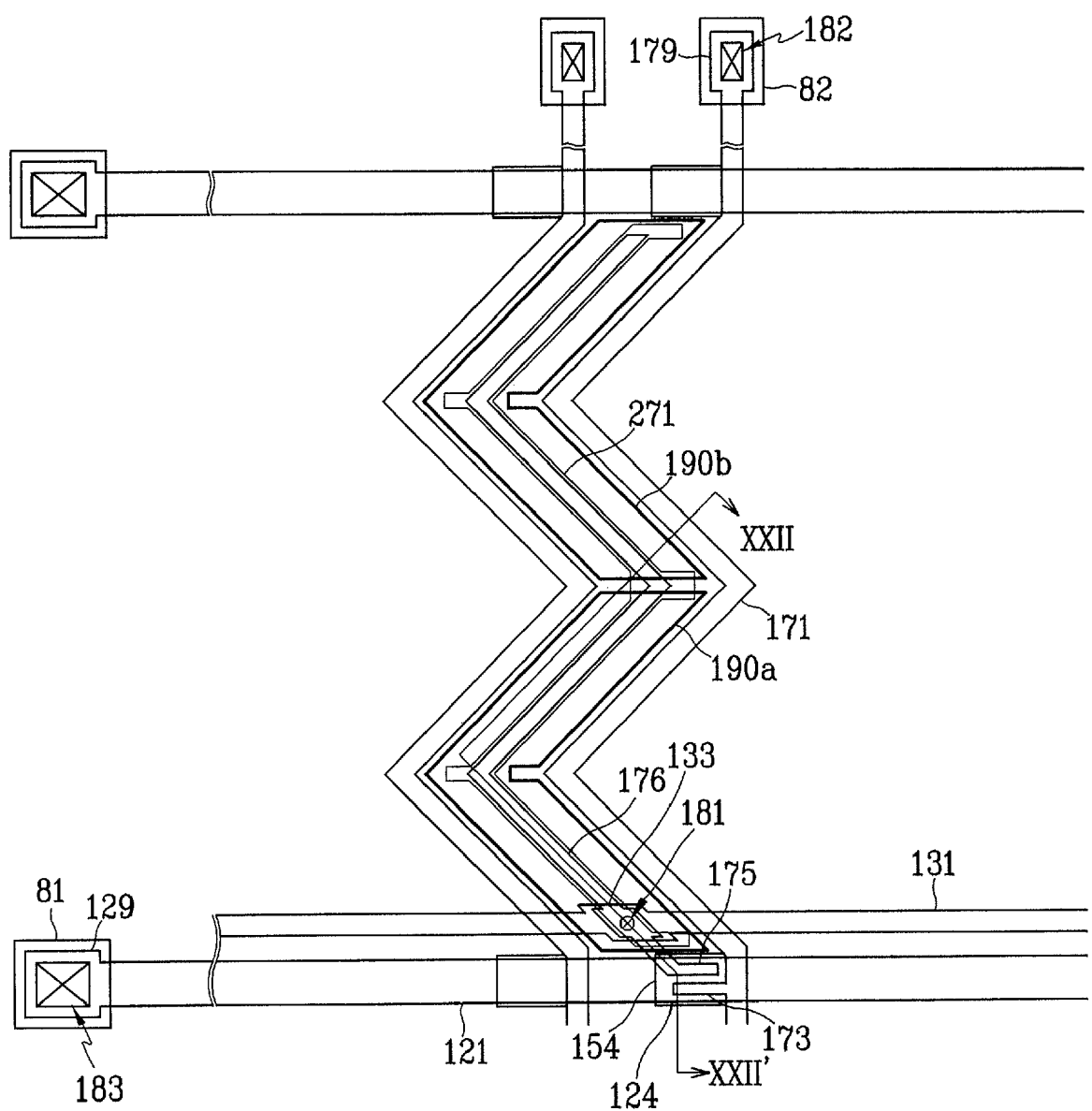
FIG. 21 is a top view of an LCD according to the embodiment shown in FIGS. 19 and 20.
Figure 22:
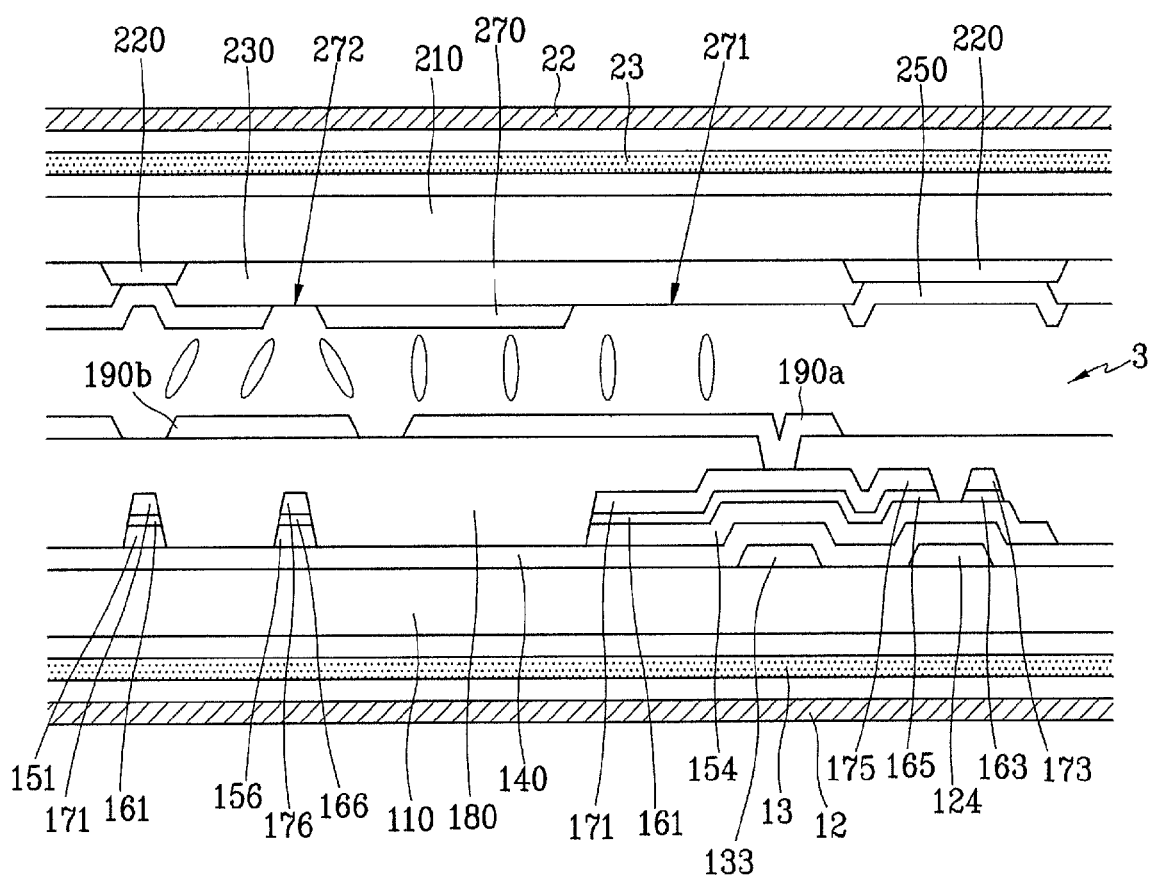
FIG. 22 is a sectional view of the LCD shown in FIG. 21 taken along the line XXII-XXII'.

FIG. 19 is a top view of a thin film transistor array panel for a LCD according to another embodiment of the present invention. FIG. 20 is a top view of a common electrode panel for a LCD according to another embodiment of the present invention. FIG. 21 is a top view of an LCD according to the embodiment shown in FIGS. 19 and 20. FIG. 22 is a sectional view of the LCD shown in FIG. 21 taken along the line XXII-XXII'.

An LCD according to an embodiment of FIGS. 19 to 22 includes a TFT array panel 100, a common electrode panel 200, and a LC layer 3 interposed between the panels 100 and 200 and containing a plurality of LC molecules aligned vertical to surfaces of the panels 100 and 200.

Referring to FIGS. 19, 21, and 22, the array panel 100 also includes a plurality of gate lines 121 and a plurality of storage electrode lines 131 formed on an insulating substrate 110.

As shown, the gate lines 121 extend substantially in a transverse direction and are separated from each other and transmit gate signals. The gate line 121 also includes a plurality of gate electrodes 124 as well as gate pads 129 for connecting to an external circuit.

Like the gate lines 121, each storage electrode line 131 extends substantially in the transverse direction. In one embodiment, a storage electrode lines 131 substantially parallels a gate line 121. Additionally, each storage electrode line includes a plurality of branches that form a corresponding plurality of storage electrodes 133. In one embodiment, each storage electrode 133 includes a pair of oblique portions that make an angle of about 45 degrees with the storage line 131. Two oblique portions forming a pair make an angle about 90 degrees with each other. In use, storage electrode lines 131 are supplied with a predetermined voltage, for example, a common voltage applied to a common electrode 270 formed on the other panel 200 of the LCD, as shown in FIG. 4.

Each of the gate lines 121 and the storage electrode lines 131 may have a multi-layered structure that includes two films that have different physical characteristics from each other. Illustratively, each line may include a lower film (not shown) and an upper film (not shown). The upper film is preferably made of a low resistivity metal, such as, for example Al, a metal containing AL, or an AL alloy. A low resistivity metal is used to reduce signal delay or voltage drop in the gate lines 121 and the storage electrode lines 131. On the other hand, the lower film is preferably made of a material such as Cr, Mo, or a Mo alloy. However, any material that has good contact characteristics with other materials such as indium tin oxide (ITO), indium zinc oxide (IZO) or similar materials, may be used. One exemplary combination of the lower film material and the upper film material is Cr and a Al—Nd alloy. In such a combination, CR may form the lower film and the Al—Nd alloy may form the upper film.

Referring to FIG. 22, the lateral sides of the gate lines 121 and the storage electrode lines 131 may be tapered. It tapered, the inclination angle of the lateral sides with respect to a surface of the substrate 110 is in a range of about 30-80 degrees.

Referring to FIG. 22, gate insulating layer 140 preferably made of silicon nitride (SiNx) may be formed on the gate lines 121 and the storage electrode lines 131.

A plurality of semiconductor strips 151 preferably made of hydrogenated amorphous silicon (abbreviated to "a-Si") is formed on the gate insulating layer 140. As illustratively shown, each semiconductor strip 151 extends substantially in the longitudinal direction and has a plurality of projections 154 branched out toward the gate electrodes 124. An extension 156 may be elongated from the projection 154.

As illustratively shown, each semiconductor strips 151 is bent repeatedly and includes a plurality of pairs of oblique portions and a plurality of longitudinal portions. Two oblique portions make a pair. Two pairs of oblique portions are connected to each other to form a double chevron and opposite ends of the double chevron portion are connected to respective longitudinal portions. The oblique portions of the semiconductor strip make an angle about 45 degrees with the gate lines 121, and the longitudinal portions cross over the gate electrodes 124. A double chevron portion is about one to nine times longer than a longitudinal portion. That is, it occupies about 50-90 percent of the total length of a double chevron portion and a longitudinal portion.

In one embodiment, the extension 156 includes a drain portion extended obliquely from the projection 154, a pair of oblique portions making an angle about 45 degrees with the gate lines 121, and a connector connecting the drain portion and an end of the pair of oblique portions.

A plurality of ohmic contact strips 161 and islands 165, preferably made of silicide or n+ hydrogenated a-Si heavily doped with n type impurity, may be formed on the semiconductor strips 151 and extensions 156. Each ohmic contact strip 161 has a plurality of projections 163. In one embodiment, the projections 163 and the ohmic contact islands 165 are located in pairs on the projections 154 of the semiconductor strips 151.

The edge surfaces of the semiconductor strips 151 and the ohmic contacts 161, 165, and 166 are tapered, and the inclination angles of the edge surfaces of the semiconductor strips 151 and the ohmic contacts 161, 165, and 166 are preferably in a range of about 30-80 degrees.

A plurality of data lines 171, a plurality of drain electrodes 175, and a plurality of coupling electrodes 176 are formed on the ohmic contacts 161, 165, and 166 and the gate insulating layer 140, respectively.

Consequently, one or more pixel areas may be defined by FIGS. 19-22, such pixel areas may have a triple bent strip shape crossing of the gate line 121 and the data line 171.

In one embodiment, the data lines 171 for transmitting data voltages extend substantially in the longitudinal direction and intersect the gate lines 121 and the storage electrode lines 131. Each data line 171 is bent repeatedly and includes a plurality of pairs of oblique portions and a plurality of longitudinal portions. Two adjacent oblique portions make a pair. Two pairs of oblique portions are connected to each other to form a double chevron and opposite ends of the double chevron portion are connected to respective longitudinal portions. The oblique portions of the data lines 171 make an angle of about 45 degrees with the gate lines 121, and the longitudinal portions cross over the gate electrodes 124. The length of a double chevron portion is about one to nine times the length of a longitudinal portion, that is, it occupies about 50-90 percent of the total length of a double chevron portion and a longitudinal portion.

As shown in FIG. 19, each data line 171 may include a data pad 179 that is wider than the data line for contacting another layer or an external device. A plurality of branches of each data line 171 may project toward drain electrodes 175 to form a plurality of source electrodes 173. As shown, pairs of source electrodes 173 and drain electrodes 175 are separated from and facing each other with a gate electrode 124 there between. In one embodiment, the combination of a gate electrode 124, a source electrode 173, and a drain electrode 175, together with a projection 154 of a semiconductor strip 151, forms a TFT having a channel formed in the projection 154, disposed between the source electrode 173 and the drain electrode 175.

As shown in FIGS. 19-22, a plurality of coupling electrodes 176 are formed on the same layer and made of the same material as the drain electrode 175. Coupling electrodes 176 are connected to the drain electrodes 175 extended from the drain electrode 175. A first portion of the coupling electrode 176 makes an angle of 135 degrees with a gate line 121. A second portion of the coupling electrode 176 makes an angle of about 45 degrees with the gate line 121. The first and second portions of coupling electrode 176 are substantially parallel with the double chevron portions of the data line 171. Thus in one embodiment, the coupling electrode 176 may also have a double chevron shape.

As shown, the coupling electrodes 176 have an expansion that overlaps the storage electrode 133. The expansion of the coupling electrode 176 increases storage capacitance and widens a contact area with a first pixel electrode 190a.

Each of data lines 171, the drain electrodes 175, and the coupling electrodes 176 may have a multi-layered structure that includes two films having different physical characteristics. For example, each data line drain electrode, and coupling electrode may include a lower film (not shown) and an upper film (not shown). In one embodiment, the upper film may be preferably made of low resistivity metal that includes, for example, Al or an Al alloy. A low resistivity material is used to reduce signal delay or voltage drop in the data lines. On the other hand, the lower film may be preferably made of a material that has good contact characteristics with indium tin oxide (ITO), indium zinc oxide (IZO) or similar materials. Illustrative lower film materials include but are not limited to Cr, Mo, or a Mo alloy. A good exemplary combination of the lower film material and the upper film material is Cr and Al—Nd alloy. In such a combination, Cr forms the lower material and an Al—Nd alloyforms the upper film.

Additionally, the lateral sides of each of the data lines 171, the drain electrodes 175, and the coupling electrodes 176 may be tapered. If tapered, the inclination angle of the lateral sides with respect to a surface of the substrate 110 is in the range of about 30-80 degrees.

A passivation layer 180 may be formed on the data lines 171, the drain electrodes 175, and the coupling electrodes 176. In one embodiment, the passivation layer 180 is preferably made of a flat photosensitive organic material and low dielectric insulating material having a dielectric constant under 4.0. Exemplary materials used to form passivation layer 180 include, but are not limited to a-Si:C:O and a-Si:O: F, each formed by plasma enhanced chemical vapor deposition (PECVD). Alternatively, an inorganic material such as silicon nitride, silicon oxide or other similar material may be used.

In one embodiment, passivation layer 180 includes a plurality of contact holes 181 and 182 that expose the drain electrodes 175 and the expansion connectors 179 of the data lines 171, respectively. Additionally, the passivation layer 180 and the gate insulating layer 140 have a plurality of contact holes 183 that expose the expansion connectors 129 of the gate lines 121. Illustratively, the sidewalls of the contact holes 181, 182, and 183 may make an angle of about 30-85 degrees with respect to the surface of the substrate 110 and may also include one or more stepped portions. Depending on the embodiment, the contact holes 181, 182, and 183 may have various planar shapes, such as a rectangular or circular shape. In one embodiment, the area of each contact hole 181, 182, and 183 is preferably greater than or equal to about 0.5 mm×15 μm and not larger than about 2 mm×60 μm.

In one embodiment, a plurality of pairs of pixel electrodes 190a and 190b and a plurality of contact assistants 81 and 82, which are preferably made of ITO, IZO or Cr, are formed on the passivation layer 180.

As previously described, the first pixel electrode 190a and the second pixel electrode 190b may respectively occupy a lower half and upper half of a pixel area defined by the crossing of two gate lines 121 and two data lines 171. Illustratively, each of the first pixel electrode 190a and the second pixel electrode 190b may have a shape of single bent band. Additionally, the first pixel electrode 190b may have a transverse cutout 191, and the second pixel electrode 190b may have a transverse cutout 192.

In one embodiment, the first pixel electrode 190a physically and electrically connects to the coupling electrodes 176 through the contact holes 181. The second pixel electrode 190b is physically and electrically floated, but overlaps with the coupling electrode 176 to form coupling capacitances with the first pixel electrode 190a. Therefore, the voltage of the second pixel electrode 190b depends on the voltage of the first pixel electrode 190a. Consequently, the voltage of the second pixel electrode 190b with respect to the common voltage will always be smaller than that of the first pixel electrode 190a. As a result, applied voltage at lower half of a pixel area will be higher than that at a upper half of the pixel area.

In the present embodiment, the coupling electrodes 176 routes an image signal from a thin film transistor to the first pixel electrode 190a and couples the first pixel electrode 190a, to the second pixel electrode 190b. As mentioned previously, lateral visibility is improved by mutual compensation when a pixel area includes two sub-areas that each have somewhat different electric fields. More significantly, the improved spatial dispersibility of a pixel area achieved by embodiments of the invention prevents broken images even in a LCD that has low pixel density.

A plurality of contact assistants 81 and 82 may be respectively connected to the gate pads 129 of the gate lines 121 and the gate pads 179 of the data lines 171 through the contact holes 182b and 183b formed on the passivation layer 180. The pixel electrodes 190a and 190b and the contact assistants 81 and 82 may be made of ITO (indium tin oxide), IZO (indium zinc oxide), or similar materials.

The common electrode panel 200 will be described with respect to FIGS. 20, 21, and 22.

A plurality of red, green and blue color filters 230 are formed on the black matrix and the substrate 210 and extend substantially along the columns of the pixel areas and periodically bend as the shape of the pixel areas bends. In other words, the color filters 230 extend substantially in the longitudinal direction along pixel columns defined by black matrix 220 and are periodically bent along the shape of pixels area. A common electrode 270, preferably made of transparent conductive material such as ITO and IZO may be formed on the color filter 230. In one embodiment, the common electrode 270 includes a plurality of cutouts 271 and 272. The cutouts 271 and 272 may function as domain control means and preferably have width of about 9~12 μm. When organic protrusions replace the cutouts 271, the organic protrusions preferably have width of 5~10 μm.

Referring to FIG. 20, a cutout 271 of common electrode 270 is disposed in a pixel area and bent along the shape of a pixel area. The cutout 271 is disposed to divide the first pixel electrode 190a and the second pixel electrode 190b into right half portions and left half portions. Both ends of the cutout 271 are bent and extended to a predetermined length in a direction parallel with the gate line 121. The first and third bent portion also extended a predetermined length in a direction substantially parallel with the gate line 121 but opposite to the ends of the cutout 271. The second bent portion extended to a predetermined length in a direction of the same with the ends of the cutout 271.

As shown, the LCD may include a TFT array panel 100, a color filter array panel 200 facing the TFT array panel 100 and separated by a predetermined gap, and a liquid crystal layer 3 filled in the predetermined gap.

The LC molecules in the LC layer 3 are aligned such that their long axes are substantially vertical to the surfaces of the panels 100 and 200 when there is no electric field. The liquid crystal layer 3 has negative dielectric anisotropy.

The thin film transistor array panel 100 and the color filter array panel 200 are assembled such that the pixel electrodes 190a and 190b precisely correspond to the color filter 230. When the two panels 100 and 200 are assembled, pixel areas are divided into a plurality of sub-areas by the edge of the first and second pixel electrode 190a and 190b and the cutouts 271 and 272. A liquid crystal region on each sub-area is called a domain. Thus, in one embodiment, a pixel region is divided into 4 domains by the cutouts 271 and 272. The domains have two parallel longest edges. The distance between two longest edges of each domain, e.g., the width of the domain, is preferably about 10~30 μm.

A pair of polarizers 12 and 22 is provided on the outer surfaces of the panels 100 and 200, respectively, such that the transmissive axis of each polarizer is crossed. Additionally the pair of polarizers is positioned so that at least one of the transmissive axes substantially parallels the gate lines 121.

The LCD may further include at least one retardation film (e.g., an optical element that produces, for example, full, half, or quarter wave phase changes of polarized light). The retardation film functions to compensate for the retardation of light caused by the LC layer 3.

In use a common voltage is applied to the common electrode 270 and a data voltage is applied to the pixel electrodes 191a and 191b. The application of their voltages generates a primary electric field which is substantially perpendicular to the surfaces of the panels 100 and 200. In response to the electric field, the LC molecules rotate until their long axes are perpendicular to the field direction. The cutouts 271 and 272 of the common electrode 270 and the edges of the pixel electrodes 190a and 190b distort the primary electric field and give it a horizontal component which determines the tilt directions of the LC molecules. The horizontal component of the primary electric field adopts four different orientations, thereby forming four domains in the LC layer 3 with different LC molecule tilt directions. The horizontal component is substantially perpendicular to the first and second edges of the cutouts 271 and 272, and substantially perpendicular to the edge of the pixel electrode 190a and 190b. Accordingly, four domains having different tilt directions are formed in the LC layer 300. In an alternative embodiment, a plurality of protrusions formed on the common electrode 270 may be substituted for the cutouts 271 and 272 because the tilt directions of the LC molecules also can be controlled by a plurality of protrusions (not shown).

The direction of a secondary electric field due to the voltage difference between the pixel electrodes 190a and 190b is substantially perpendicular to each of the edges of the cutouts 271 and 272. Accordingly, the field direction of the secondary electric field coincides with that of the horizontal component of the primary electric field. Consequently, the secondary electric field between the pixel electrodes 190a and 190b enhances the tilt directions of the LC molecules.

Since the LCD performs inversion (i.e., inverting the polarity of an applied voltage) such as dot inversion, column inversion, etc., a secondary electric field that enhances the tilt directions of the LC molecules may be attained by supplying an adjacent pixel electrode with a data voltage having opposite polarity with respect to the common voltage. As a result, a direction of the secondary electric field generated between adjacent pixel electrodes is equivalent to the horizontal component of the primary electric field generated between the common and pixel electrodes. Thus, a secondary electric field between the adjacent pixel electrodes may be generated to enhance the stability of the domains.

In one embodiment, the tilt directions of all the domains form an angle of about 45 degrees with the gate lines 121, and the gate lines 121 are parallel to or perpendicular to the edges of the panels 100 and 200. Since a 45-degree intersection of the tilt directions and transmissive axes of the polarizers results in maximum transmittance, the polarizers can be attached such that the transmissive axes of the polarizers are parallel or perpendicular to the edges of the panels 100 and 200, thereby reducing the production cost.

As described above, when two pixel electrodes 190a and 190b having different voltages are disposed in a pixel area, the distortion of the gamma curve decreases due to compensation created by the two pixel electrodes 190a and 190b. Furthermore, since the spatial dispersibility of a pixel area is diminished, broken image is prevented even in an LCD that has a low density of pixels.

Figure 23:
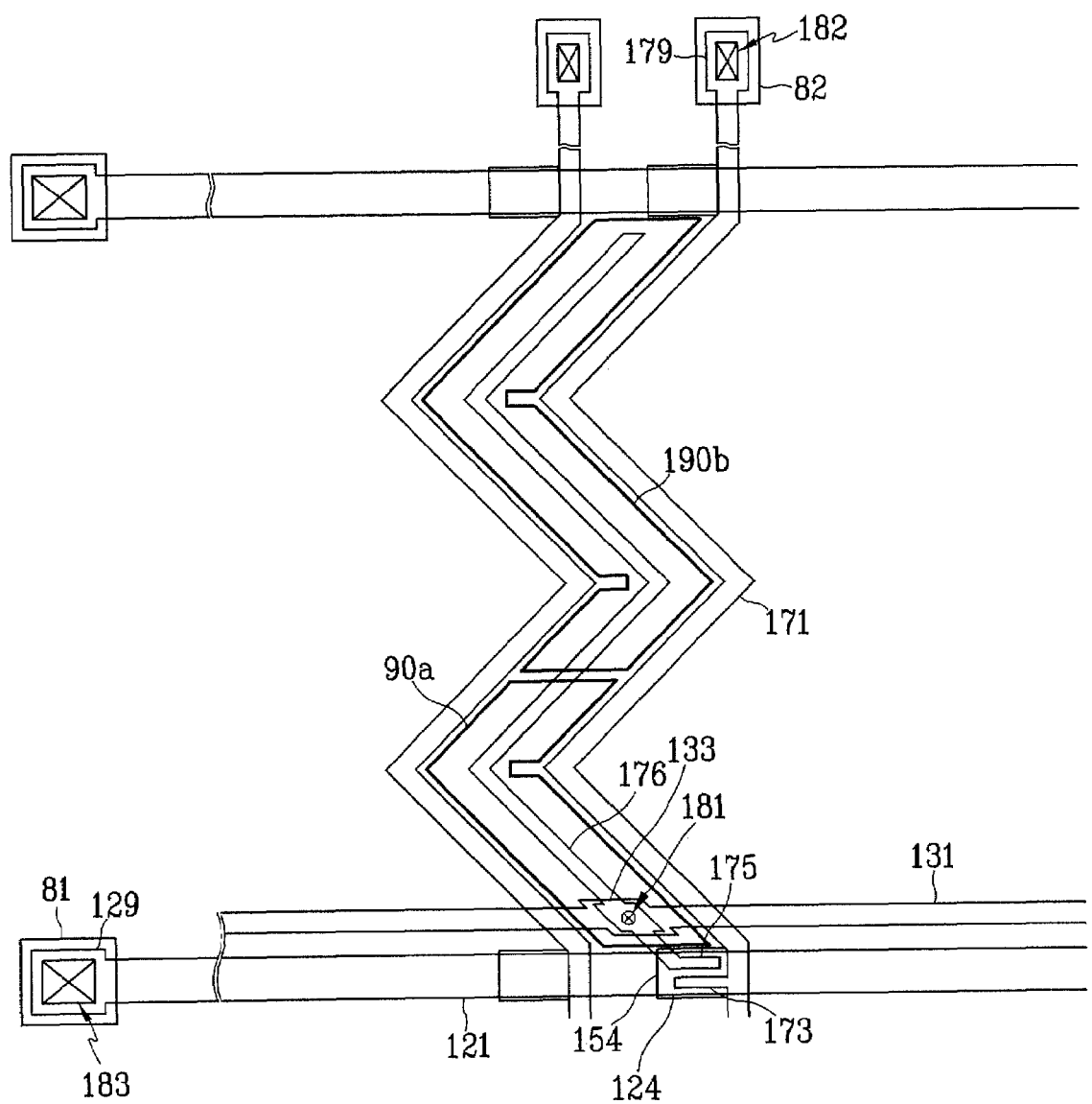
FIG. 23 is a top view of a thin film transistor array panel for a LCD according to another embodiment of the present invention.
Figure 24:
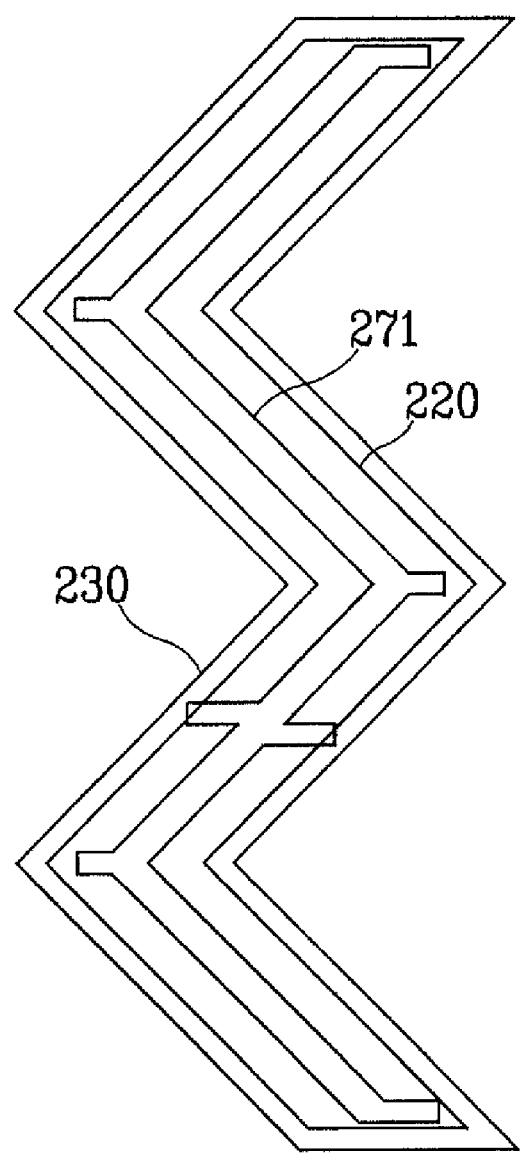
FIG. 24 is a top view of a common electrode panel for a LCD according to another embodiment of the present invention.
Figure 25:
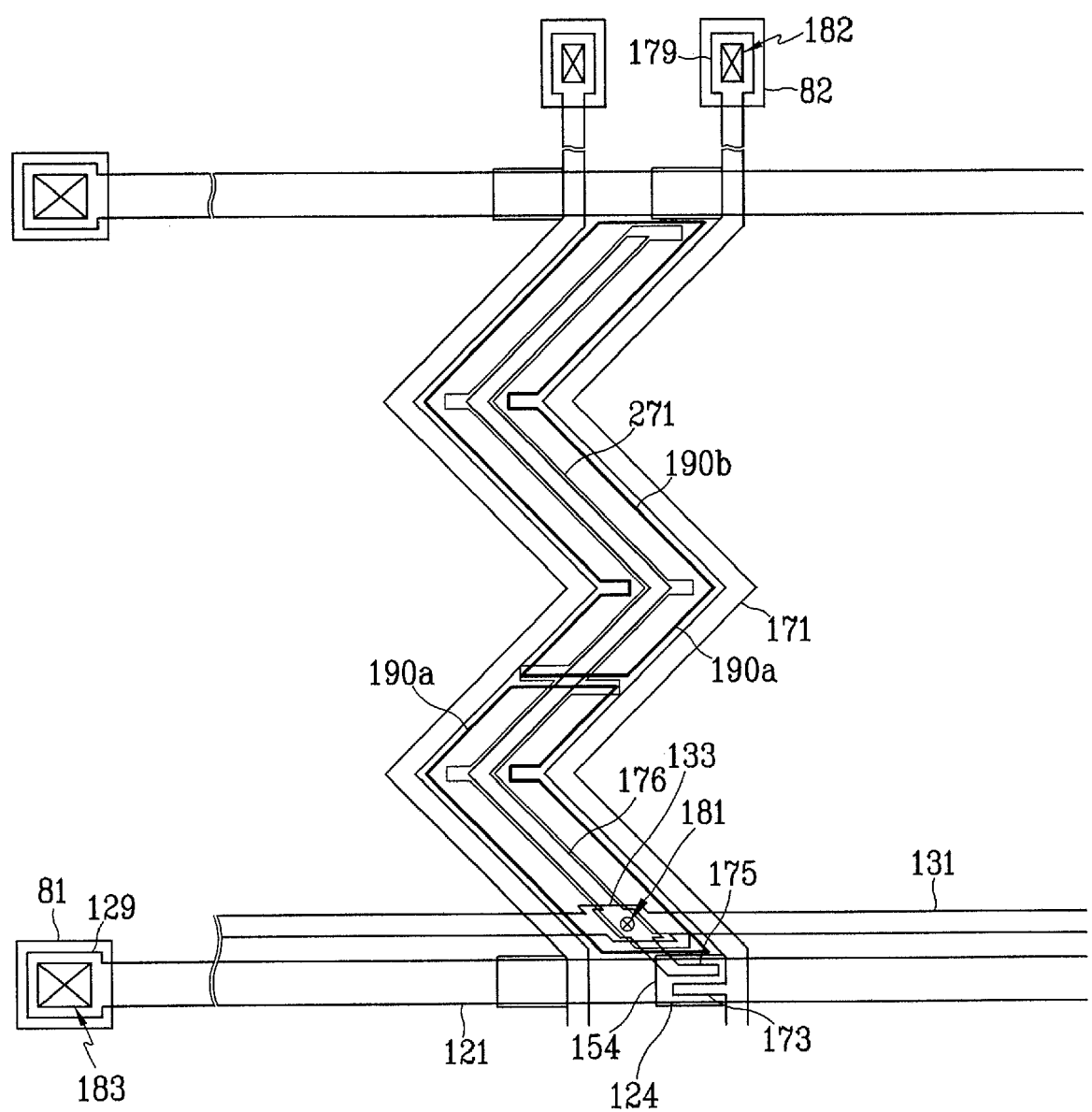
FIG. 25 is a top view of an LCD according to the embodiment shown in FIGS. 23 and 24.

FIG. 23 is a top view of a thin film transistor array panel for a LCD according to another embodiment of the present invention. FIG. 24 is a top view of a common electrode panel for a LCD according to another embodiment of the present invention. FIG. 25 is a top view of an LCD according to the embodiment shown in FIGS. 23 and 24.

When compared with the embodiment of FIGS. 19 to 22, the embodiment of FIGS. 23, 24 and 25 reduced the size of first pixel electrode 190a by about a ¼ and increased the size of the second pixel electrode 190b by about a ¼. As shown, the cutouts 271 of the common electrode 270 further include branch cutouts which overlap the boundary area of the first and second pixel electrodes 190a and 190b.

In one embodiment, a ratio of the first pixel electrode 190a and the second pixel electrode 190b may be altered according to the properties desired in a LCD.

In the embodiment of FIGS. 23 to 25, the pixel areas are formed to have a triple bent band shape and are divided into upper and lower portions by the first pixel electrode 190a and the second pixel electrode 190b. However, even though pixel areas have triple bent band shape, the first and second pixel electrodes 190a and 190b may be formed to divide the pixel areas into left and right portions.

The embodiments of FIGS. 23 to 25 show TFT array panels manufactured using four photo-mask processes. However, it will be easy to understand to those skilled in the art that the ideas of the embodiments of FIGS. 23 to 25 may be adapted to TFT array panels manufactured using five photo-mask processes.

In the above described embodiments, cutouts formed in the common electrode are shown as domain control means. However, protrusions formed on the common electrode may replace the cutouts. When protrusions are used as domain control means, the planar pattern of the organic protrusions may be the same as that of the cutouts.

In the above described embodiments, the color filters are formed on the common electrode panel. However, the color filters may be formed on the TFT array panel, more concretely between the passivation layer and the pixel electrodes.

As described above, when a pixel areas are formed to have a bent band shape, a secondary electric field between the adjacent pixel electrodes can be generated to enhance the stability of the domains and the polarizers can be attached such that the transmissive axes of the polarizers are parallel or perpendicular to the edges of the panels 100 and 200, thereby reducing the production cost.

An LCD according to the present invention includes several sub-areas with somewhat different electric fields, and lateral visibility is improved by the mutual compensation of the sub-areas.

The embodiments of FIGS. 19 to 22 and FIGS. 23 to 25 show pixel shapes of triple vent band. However, the invention is not limited to a triple bent band shape, but includes other multiple bent band shapes. Such a multi-vent band shape is helpful to reduce spatial dispersibility of a pixel area. Reduction of spatial dispersibility of a pixel area is helpful to prevent a character from being seen as broken.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A flat panel display, comprising:
   a first panel;
   a second panel; and
   a liquid crystal layer interposed between the first panel and the second panel,
   wherein the first panel comprises:
   a substrate having a plurality of pixel areas, each pixel area including a first sub-pixel area and a second sub-pixel area, the first sub-pixel area configured to have a greater electric field than the second sub-pixel area, such that mutual compensation in the two sub-pixel areas decreases distortion of a gamma curve and improves lateral visibility of the flat panel display;
   a plurality of gate lines;
   a data line comprising longitudinal portions perpendicularly crossing over the gate lines, and at least one bent portion disposed between the longitudinal portions;
   a thin film transistor (TFT) formed on the substrate and comprising a gate electrode, a source electrode connected to the data line and a drain electrode;
   a coupling electrode electrically connected to the drain electrode;
   a first sub-pixel electrode formed in the first sub-pixel area and connected to the drain electrode; and
   a second sub-pixel electrode formed in the second sub-pixel area, floated and overlapping the coupling electrode to form coupling capacitances with the first sub-pixel electrode,
   wherein at least one of the first sub-pixel electrode and the second sub-pixel electrode have a shape of a bent-band that matches the shape of the pixel areas, and
   the second panel comprises a common electrode having at least one cutout or at least one protrusion, the at least one cutout or at least one protrusion dividing the pixel area into a plurality of sub-areas.

2. The flat panel display of claim 1, wherein the cutout or the protrusion is bent along a shape of the pixel area.

3. The flat panel display of claim 2, wherein the cutout or the protrusion comprises:
   a plurality of oblique portions, the oblique portions being connected to form a chevron; and a first extension extended from ends of the oblique portions.

4. The flat panel display of claim 3, further comprising a second extension extended from a position where the oblique portions are connected.

5. The flat panel display of claim 3, wherein the data line comprises a plurality of oblique portions disposed between the longitudinal portions, and the oblique portions make an angle of about 45 degrees with the gate lines, and the oblique portions of the cutout or the protrusion are parallel to the oblique portions of the data line.

6. The flat panel display of claim 5, further comprising a pair of polarizers disposed on outer surfaces of the first and the second panels, wherein transmission axes of the polarizers are crossed with each other, and the pair of polarizers is disposed so that at least one of the transmission axes parallels the gate lines.

7. The flat panel display of claim 2, further comprising a storage electrode line and a storage electrode connected to the storage electrode line and overlapping the first sub-pixel electrode.

8. The flat panel display of claim 7, wherein at least a portion of the storage electrode is extended along the at least one cutout or at least one protrusion.

9. The flat panel display of claim 7, wherein the cutout or the protrusion comprises:
   a plurality of oblique portions, the oblique portions being connected to form a chevron; and
   a first extension extended from ends of the oblique portions.

10. The flat panel display of claim 9, further comprising a second extension extended from a position where the oblique portions are connected.

11. The flat panel display of claim 9, wherein the data line comprises a plurality of oblique portions disposed between the longitudinal portions, and the oblique portions make an angle of about 45 degrees with the gate lines, and the oblique portions of the cutout or the protrusion are parallel to the oblique portions of the data line.

12. The flat panel display of claim 11, further comprising a pair of polarizers disposed on outer surfaces of the first and the second panels, wherein transmission axes of the polarizers are crossed with each other, and the pair of polarizers is disposed so that at least one of the transmission axes parallels the gate lines.

\* \* \* \* \*